US011914147B2

(12) United States Patent
Oto et al.

(10) Patent No.: US 11,914,147 B2
(45) Date of Patent: *Feb. 27, 2024

(54) IMAGE GENERATION APPARATUS AND IMAGE GENERATION METHOD USING FREQUENCY LOWER THAN DISPLAY FRAME RATE

(71) Applicants: Sony Interactive Entertainment Inc., Tokyo (JP); Sony Interactive Entertainment Europe Limited, London (GB)

(72) Inventors: Tomohiro Oto, Tokyo (JP); Simon Mark Benson, London (GB); Ian Henry Bickerstaff, London (GB)

(73) Assignees: Sony Interactive Entertainment Inc., Tokyo (JP); Sony Interactive Entertainment Europe Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,968

(22) Filed: Jan. 23, 2023

(65) Prior Publication Data
US 2023/0161157 A1 May 25, 2023

Related U.S. Application Data

(63) Continuation of application No. 17/237,523, filed on Apr. 22, 2021, now Pat. No. 11,592,668, which is a
(Continued)

(30) Foreign Application Priority Data

Nov. 11, 2013 (JP) .................................. 2013-233428

(51) Int. Cl.
G02B 27/01 (2006.01)
G06F 3/01 (2006.01)
A63F 13/25 (2014.01)

(52) U.S. Cl.
CPC ............ *G02B 27/017* (2013.01); *A63F 13/25* (2014.09); *G06F 3/012* (2013.01);
(Continued)

(58) Field of Classification Search
CPC ............ A63F 13/25; G02B 2027/0123; G02B 2027/014; G02B 2027/0187;
(Continued)

(56) References Cited

U.S. PATENT DOCUMENTS 6,271,855 B1 8/2001 Shum
8,212,839 B2 7/2012 Yoshiike
(Continued)

FOREIGN PATENT DOCUMENTS

CN 101416222 A 4/2009
CN 102540464 A 7/2012
(Continued)

OTHER PUBLICATIONS

Office Action for corresponding CN Application No. 202010310555. 1, 12 pages, dated Mar. 4, 2023.
(Continued)

*Primary Examiner* — Richard J Hong
(74) *Attorney, Agent, or Firm* — Matthew B. Dernier, Esq.

(57) ABSTRACT

Methods and apparatus provide for generating an image by way of acquiring information relating to at least one of a position and a rotation of a camera. The image is generated for display on a display unit. A rate at which the image is
(Continued)

generated is at a first frequency, which is lower than a second frequency corresponding to a frame rate of the display unit.

18 Claims, 14 Drawing Sheets

Related U.S. Application Data continuation of application No. 16/867,716, filed on May 6, 2020, now Pat. No. 11,016,297, which is a continuation of application No. 16/160,612, filed on Oct. 15, 2018, now Pat. No. 10,684,475, which is a continuation of application No. 15/033,701, filed as application No. PCT/JP2014/079082 on Oct. 31, 2014, now Pat. No. 10,133,073.

(52) U.S. Cl.
CPC ............... *G02B 2027/014* (2013.01); *G02B 2027/0123* (2013.01); *G02B 2027/0187* (2013.01)

(58) Field of Classification Search
CPC .. G02B 27/017; G02B 27/64; G02B 27/0172; G06F 3/012; H04N 9/3194
See application file for complete search history.

(56) References Cited

U.S. PATENT DOCUMENTS

| | | | |
|---|---|---|---|
| 8,576,276 | B2 | 11/2013 | Bar-Zeev |
| 9,179,119 | B2 | 11/2015 | Mishima |
| 9,191,658 | B2 | 11/2015 | Kato |
| 9,557,566 | B2 | 1/2017 | Fujimaki |
| 2005/0035980 | A1 | 2/2005 | Lonsing |
| 2005/0156817 | A1 | 7/2005 | Lba |
| 2008/0297437 | A1 | 12/2008 | Takahashi |
| 2009/0102860 | A1 | 4/2009 | Yoshiike |
| 2010/0026714 | A1* | 2/2010 | Utagawa ............ G02B 27/017 345/633 |
| 2010/0103077 | A1 | 4/2010 | Sugiyama |
| 2012/0127284 | A1 | 5/2012 | Bar-Zeev |
| 2012/0293407 | A1* | 11/2012 | Lee ...................... G02B 27/017 345/156 |
| 2013/0038510 | A1* | 2/2013 | Brin ..................... G02B 27/017 345/8 |
| 2013/0162783 | A1 | 6/2013 | Mishima |
| 2013/0169943 | A1* | 7/2013 | Wen ...................... H04N 9/3194 353/121 |
| 2013/0187943 | A1* | 7/2013 | Bohn ..................... G02B 27/64 345/619 |
| 2013/0234914 | A1 | 9/2013 | Fujimaki |
| 2013/0235169 | A1 | 9/2013 | Kato |
| 2014/0368504 | A1 | 12/2014 | Chen |
| 2015/0002524 | A1 | 1/2015 | Nystad |
| 2015/0002542 | A1 | 1/2015 | Chan |
| 2015/0029218 | A1* | 1/2015 | Williams ........... G02B 27/0172 345/633 |
| 2015/0173846 | A1 | 6/2015 | Schneider |
| 2016/0335806 | A1 | 11/2016 | Chan |

FOREIGN PATENT DOCUMENTS

| | | |
|---|---|---|
| CN | 103179411 A | 6/2013 |
| CN | 103309034 A | 9/2013 |
| CN | 103380625 A | 10/2013 |
| JP | 10341387 A | 12/1998 |
| JP | 2004109994 A | 4/2004 |
| JP | 2012033038 A | 2/2012 |

OTHER PUBLICATIONS

Office Action for corresponding CN Application No. 201480061487. 2, 15 pages, dated May 22, 2018.

Japanese Patent Office Action on Patentability for Japanese App. No. JP 2013-233428, 4 pages, dated Dec. 5, 2017.

Jean-Yves Didier et al., "A Time Delay Compensation Method Improving Registration for Augmented Reality," Proceedings of the 2005 IEEE International Conference on Robotics and Automation, Barcelona, Spain, Apr. 2005, 6 pages, pp. 3384-3389, IEEE, Piscataway, NJ. (For relevancy see Non Pat. Lit. #1 and #10).

William R. Mark et al., "Post-Rendering 30 Warping," Proceedings of 1997 Symposium on Interactive 3D Graphics, Providence, Rhode Island, Apr. 1997, 10 pages, pp. 7-16, Interactive 3D Graphics ACM, New York, NY. (For relevancy see Non Pat. Lit. #10).

Matthew Regan et al., "Priority Rendering with a Virtual Reality Address Recalculation Pipleine," Siggraph '94 Conference Proceedings, Orlando, Florida, Jul. 1994, 8 pages, pp. 155-162, Computer Graphics Annual Conference Series, 1994, ACM, New York, NY.

Ryugo Kijima et al., "Reflex HMD to Compensate Lag and Correction of Derivative Deformation," Proceedings of the IEEE Virtual Reality, Orlando, Florida, Mar. 2002, 8 pages, pp. 172-179, IEEE Camp_ Soc., Los Alamitos, CA.

European Search Report in European Patent Application No. EP14860697.3, 10 pages, dated Jun. 12, 2017.

International Search Report from International Application No. PCT/JP2014/079082 dated Jan. 27, 2015.

International Preliminary Report on Patentability from International Application No. PCT/JP2014/079082 dated May 6, 2016.

European Search Report in corresponding Application No. EP14860697. 3, 6 pages, dated Mar. 31, 2021.

\* cited by examiner

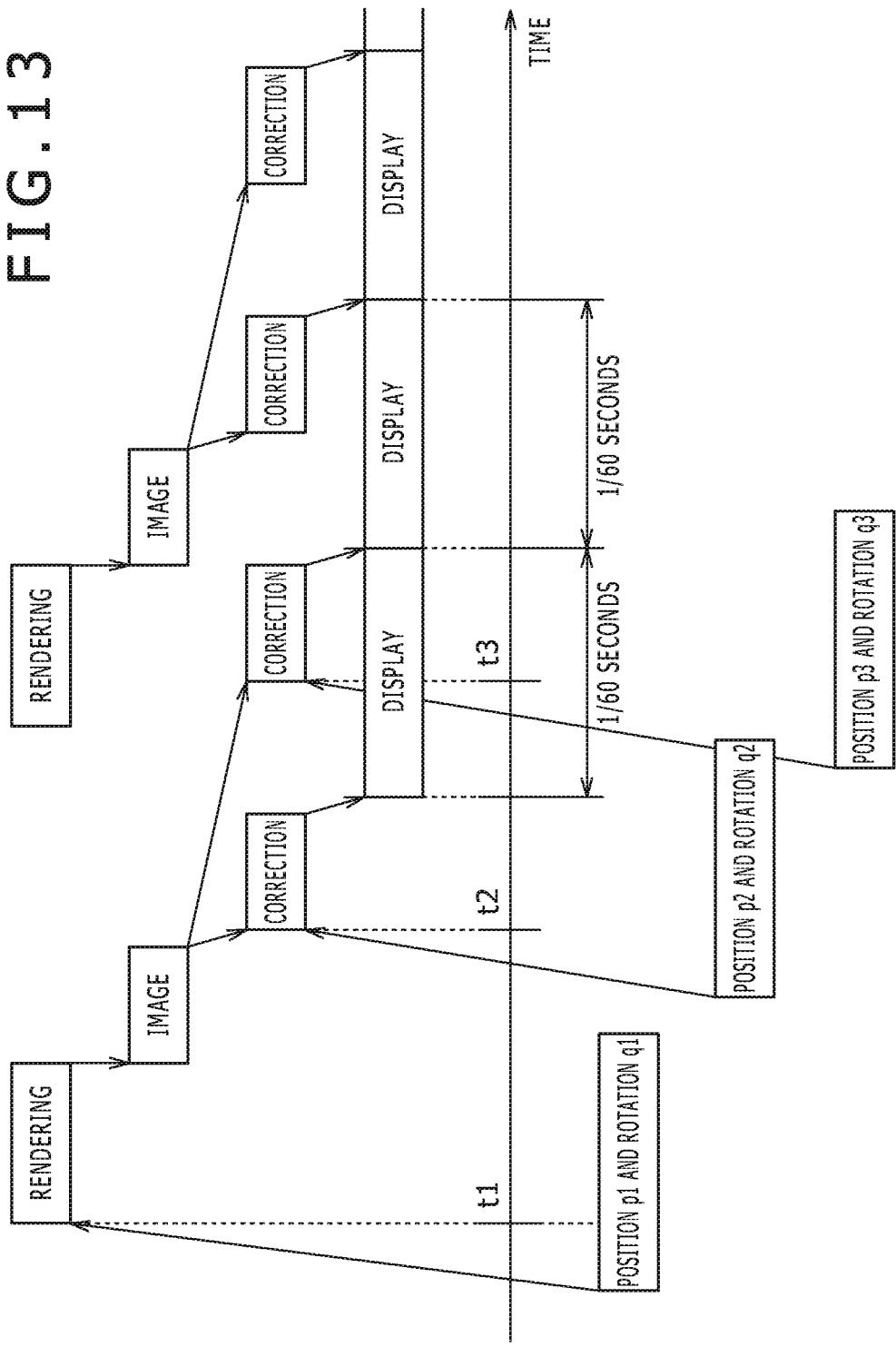

IMAGE GENERATION APPARATUS AND IMAGE GENERATION METHOD USING FREQUENCY LOWER THAN DISPLAY FRAME RATE

CROSS REFERENCE TO RELATED APPLICATIONS

This is a continuation application of U.S. patent application Ser. No. 17/237,523, allowed, accorded a filing date of Apr. 22, 2021; which is a continuation application of U.S. patent application Ser. No. 16/867,716, accorded a filing date of May 6, 2020 (U.S. Pat. No. (11,016,297 issued May 25, 2021); which is a continuation application of U.S. patent application Ser. No. 16/160,612, accorded a filing date of Oct. 15, 2018 (U.S. Pat. No. 10,684,475 issued Jun. 16, 2020); which is a continuation application of U.S. patent application Ser. No. 15/033,701, accorded a 371(c) date of May 2, 2016 (U.S. Pat. No. 10,133,073 issued Nov. 20, 2018); which is a national stage application of PCT/JP2014/079082, filed Oct. 31, 2014; which claims priority to JP 2013-233428, filed Nov. 11, 2013,
the entire disclosures of which are hereby incorporated by reference.

TECHNICAL FIELD

The present invention relates to an apparatus for and a method of generating and correcting an image.

BACKGROUND ART

A user of a head-mounted display unit connected to a game machine would wear the head-mounted display unit on the head and operate a controller or the like to play a game while watching a screen image displayed on the head-mounted display unit. In an ordinary display unit of the installation type connected to a game machine, the visual field range of the user spreads also to the outside of the screen image of the display unit. Therefore, the user cannot sometimes concentrate its attention to the screen image of the display unit or sometimes lacks in sense of immersion in the game. In this regard, if the head-mounted display unit is worn, then the user does not look at any other than the image displayed on the head-mounted display unit. Therefore, there is an effect that the sense of immersion in the video world is enhanced and the entertainment property of the game is enhanced further.

Further, if the head-mounted display unit is configured such that, when a panorama image is displayed on the head-mounted display unit and the user who wears the head-mounted display unit turns its head, a panorama image or a virtual space over 360 degrees is displayed on the head-mounted display unit, then the sense of immersion in the video is further enhanced and also the operability of an application such as a game is improved.

SUMMARY

Technical Problem

If a head-mounted display unit has a head tracking function in this manner and the viewpoint or the viewing direction is changed in an interlocked relationship with the movement of the head of the user to generate a panorama image, then some latency exists from generation to display of the panorama image. Therefore, some displacement occurs between an assumed direction of the head of the user upon generation of the panorama image and the direction of the head of the user at a point of time at which the panorama image is displayed on the head-mounted display unit. Therefore, the user sometimes falls into drunken sensation.

The present invention has been made in view of such a subject as described above, and it is an object of the present invention to provide an image generation apparatus and an image generation method which can display a corrected image whose latency after generation to display of an image is reduced.

Solution to Problem

In order to solve the subject described above, an image generation apparatus according to an aspect of the present invention includes an acquisition unit configured to acquire information relating to at least one of a viewpoint position and a viewing direction, an image generation unit configured to generate an image using information relating to at least one of a viewpoint position and a viewing direction acquired at a certain point of time by the acquisition unit, and a correction processing unit configured to receive information relating to at least one of a viewpoint position and a viewing direction updated at a different point of time from the acquisition unit and correct the image generated by the image generation unit using the updated information relating to at least one of the viewpoint position and the viewing direction.

Also another aspect of the present invention is an image generation apparatus. This apparatus is an image generation apparatus incorporated in a client connected to a server through a network and includes an acquisition unit configured to acquire visual field information including information relating to at least one of a viewpoint position and a viewing direction, and a correction processing unit configured to receive, from the server, an image generated using information relating to at least one of a viewpoint position and a viewing direction acquired at a certain point of time by the acquisition unit, receive information relating to at least one of a viewpoint position and a viewing direction updated at a different point of time from the acquisition unit and correct the received image using the updated information relating to at least one of the viewpoint position and the viewing direction.

Also a further aspect of the present invention is an image generation apparatus. This apparatus includes an acquisition unit configured to acquire information relating to at least one of a position and a rotation of the head of a user who wears a head-mounted display unit, an image generation unit configured to generate an image to be displayed on the head-mounted display unit using information relating to at least one of a position and a rotation acquired at a certain point of time by the acquisition unit, and a correction processing unit configured to receive updated information relating to at least one of a position and a rotation at a different point of time from the acquisition unit and correct the image generated by the image generation unit using the updated information relating to at least one of the position and the rotation.

A still further aspect of the present invention is an image generation method. This method includes an acquisition step of acquiring information relating to at least one of a viewpoint position and a viewing direction, an image generation step of generating an image using information relating to at least one of a viewpoint position and a viewing direction acquired at a certain point of time by the acquisition step, and a correction processing step of receiving information relating to at least one of a viewpoint position and a viewing direction updated at a different point of time and correcting the image generated by the image generation step using the updated information relating to at least one of the viewpoint position and the viewing direction.

Also a yet further aspect of the present invention is an image generation method. This method includes an acquisition step of acquiring information relating to at least one of a position and a rotation of the head of a user who wears a head-mounted display unit, an image generation step of generating an image to be displayed on the head-mounted display unit using information relating to at least one of a position and a rotation acquired at a certain point of time by the acquisition step, and a correction processing step of receiving updated information relating to at least one of a position and a rotation at a different point of time and correcting the image generated by the image generation step using the updated information relating to the position and the rotation.

It is to be noted that also an arbitrary combination of the components described above and results of conversion of the representation of the present invention between a method, an apparatus, a system, a computer program, a data structure, a recording medium and so forth are effective as modes of the present invention.

Advantageous Effect of Invention

With the present invention, a corrected image whose latency after generation till display of an image is reduced.

BRIEF DESCRIPTION OF DRAWINGS

FIG. 13 is a view illustrating an image correction process of a modification to the embodiment.

DESCRIPTION OF EMBODIMENTS

First Embodiment

Figure 1:
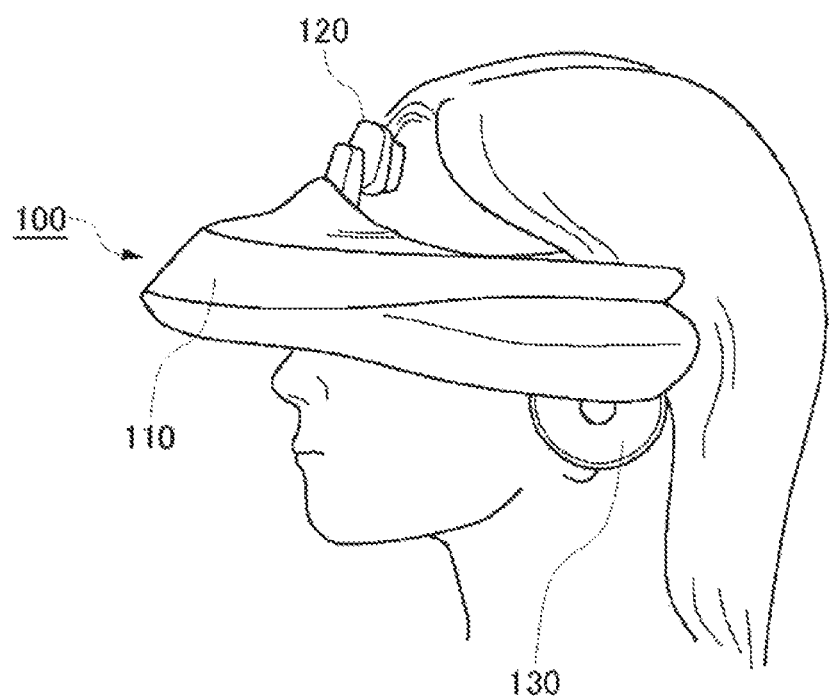
FIG. 1 is an appearance view of a head-mounted display unit.

FIG. 1 is an appearance view of a head-mounted display unit 100. The head-mounted display unit 100 includes a main body unit 110, a front head portion contact unit 120, and side head portion contact portions 130.

The head-mounted display unit 100 is a display apparatus which is mounted on the head of a user such that the user appreciates a still picture or a moving picture displayed on a display unit and listens to sound, music or the like outputted from a headphone.

Position information of a user can be measured by a position sensor such as a GPS (Global Positioning System) built in or externally mounted on the head-mounted display unit 100. Further, posture information such as a rotational angle or an inclination of the head of the user, who wears the head-mounted display unit 100, can be measured by a posture sensor built in or externally mounted on the head-mounted display unit 100.

The main body unit 110 includes the display unit, a position information acquisition sensor, the posture sensor, a communication apparatus and so forth. The front head portion contact unit 120 and the side head portion contact portions 130 may have, as optional parts, biological information acquisition sensors which can measure biological information such as the body temperature, pulse rate, blood components, sweating, brain waves and cerebral blood flow of the user.

The head-mounted display unit 100 may further include a camera for picking up an image of the eyes of the user. By the camera incorporated in the head-mounted display unit 100, the line of sight, the movement of the pupils, a blink of the eyes and so forth of the user can be detected.

Here, a generation method of an image to be displayed on the head-mounted display unit 100 is described. The image generation method of the present embodiment can be applied not only to the head-mounted display unit 100 in a narrow sense but also to a case in which glasses, an eyeglass-type display unit, an eyeglass type camera, a headphone, a headset (headphone with a microphone), an earphone, an earring, an ear camera, a cap, a cap with a microphone, a hairband or the like is mounted.

Figure 2:
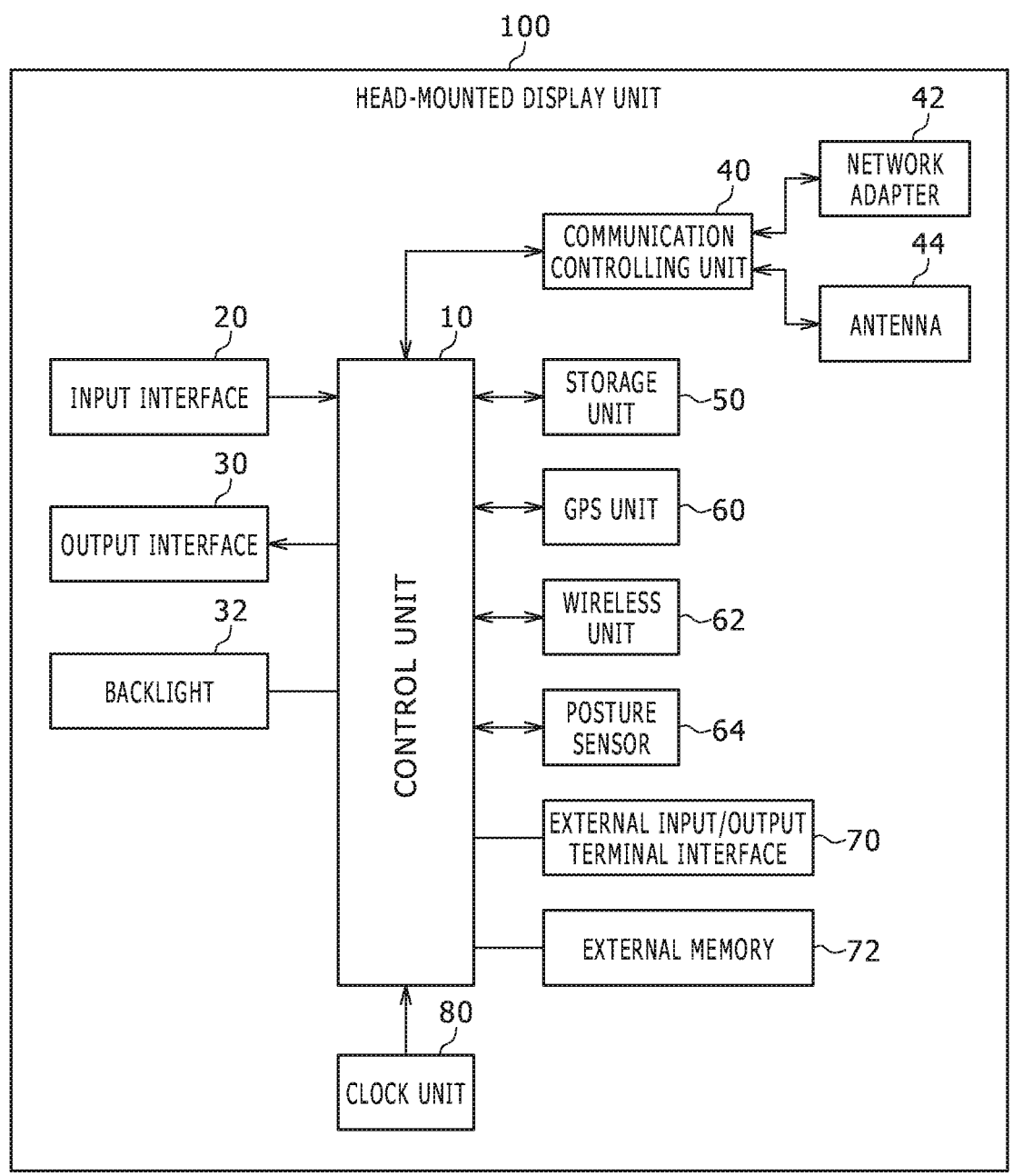
FIG. 2 is a functional block diagram of the head-mounted display unit.

FIG. 2 is a functional block diagram of the head-mounted display unit 100.

A control unit 10 is a processor which processes and outputs a signal such as an image signal or a sensor signal, instructions or data. An input interface 20 accepts an operation signal or a setting signal from a touch panel and a touch panel controller and supplies the accepted signal to the control unit 10. An output interface 30 receives an image signal from the control unit 10 and causes the display unit to display the image signal. A backlight 32 supplies backlight to a liquid crystal display unit.

A communication controlling unit 40 transmits data inputted thereto from the control unit 10 to the outside by wire or wireless communication through a network adapter 42 or an antenna 44. Further, the communication controlling unit 40 receives data from the outside by wire or wireless communication through the network adapter 42 or the antenna 44 and outputs the data to the control unit 10.

A storage unit 50 temporarily stores data or a parameter, an operation signal and so forth processed by the control unit 10.

A GPS unit 60 receives position information from GPS satellites and supplies the position information to the control unit 10 in accordance with an operation signal from the control unit 10. A wireless unit 62 receives position information from a wireless base station and supplies the position information to the control unit 10 in accordance with an operation signal from the control unit 10.

A posture sensor 64 detects posture information such as a rotational angle or an inclination of the main body unit 110 of the head-mounted display unit 100. The posture sensor 64 is implemented by a suitable combination of a gyro sensor, an acceleration sensor, an angular acceleration sensor and so forth.

An external input/output terminal interface 70 is an interface for connecting a peripheral apparatus such as a USB (Universal Serial bus) controller. An external memory 72 is an external memory such as a flash memory.

A clock unit 80 sets time information in response to a setting signal from the control unit 10 and supplies time data to the control unit 10.

The control unit 10 can supply an image or text data to the output interface 30 so that it is displayed on the display unit or can supply an image or text data to the communication controlling unit 40 so as to be transmitted to the outside.

Figure 3:
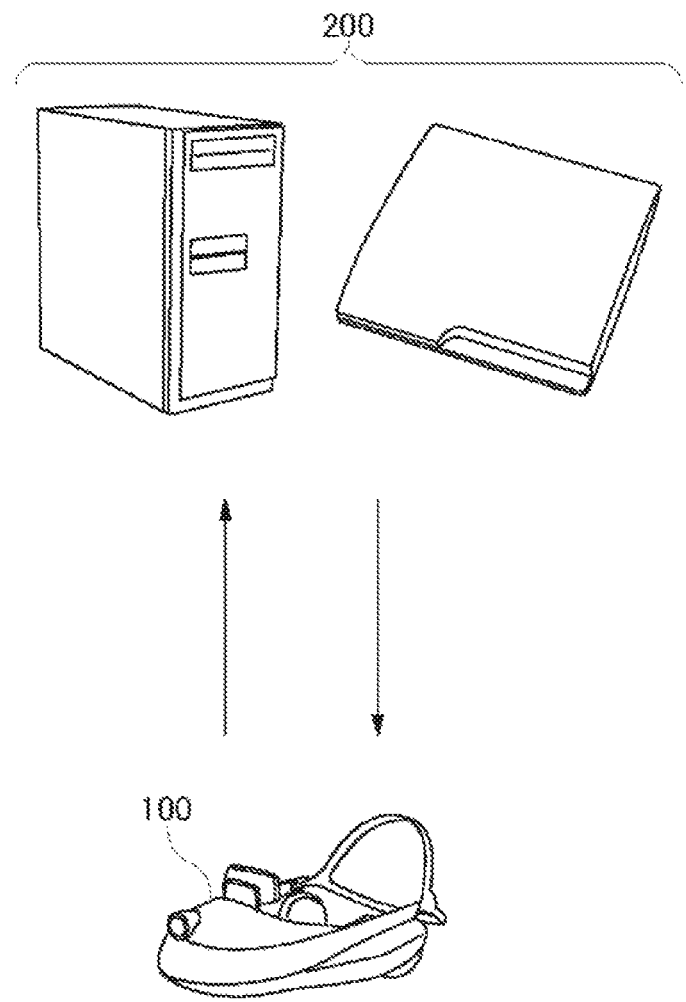
FIG. 3 is a view depicting a configuration of a panorama image generation system according to an embodiment.

FIG. 3 is a view depicting a configuration of a panorama image generation system according to an embodiment. The head-mounted display unit 100 is connected to a game machine 200 by an interface for connecting a peripheral apparatus by wireless communication or a USB. The game machine 200 may be connected further to a server through a network. In this case, the server may provide an online application of a game or the like, in which a plurality of users can participate through the network, to the game machine 200. The head-mounted display unit 100 may be connected to a computer or a portable terminal in place of the game machine 200.

Figure 4:
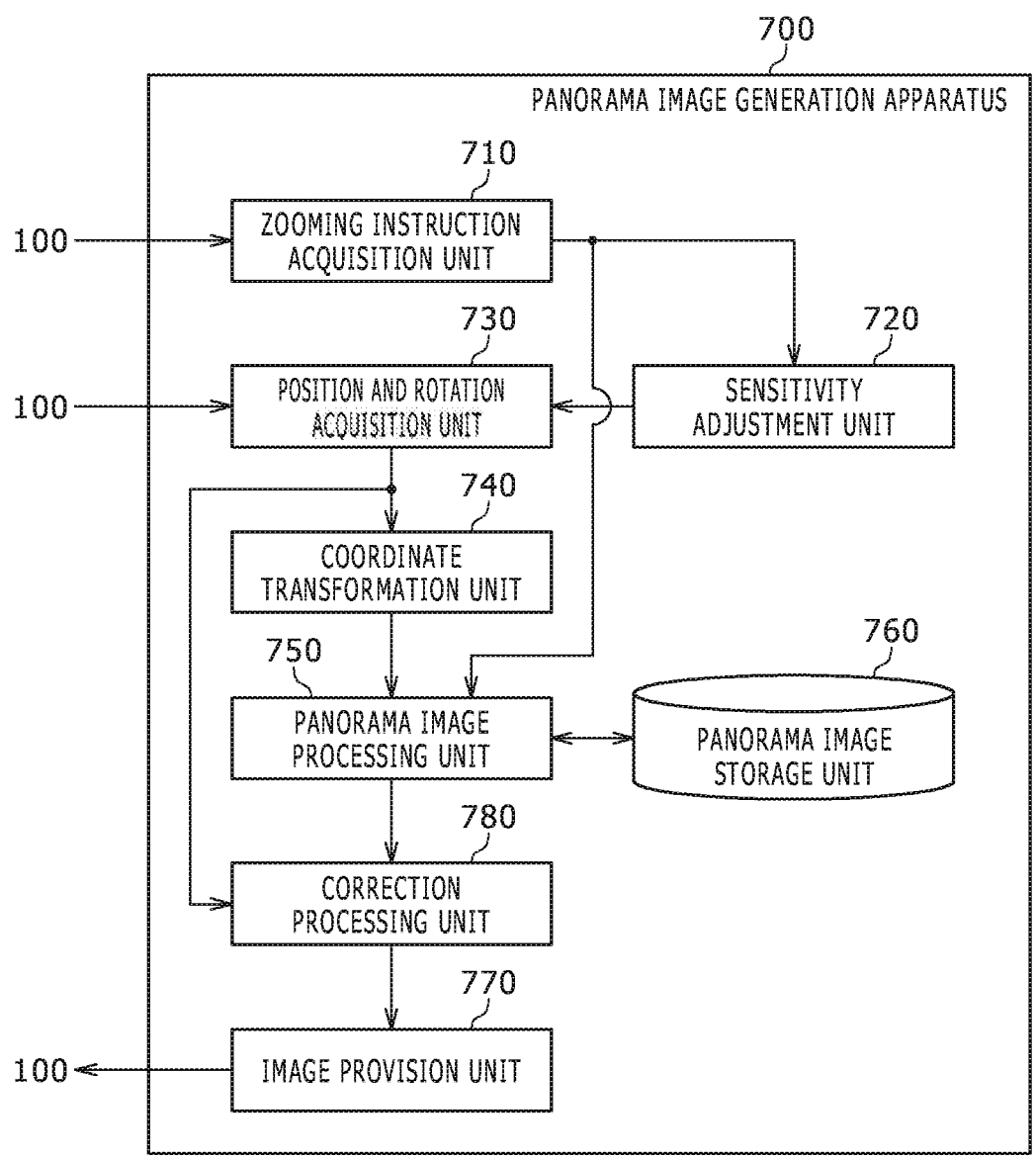
FIG. 4 is a functional block diagram of a panorama image generation apparatus according to the embodiment.

FIG. 4 is a functional block diagram of a panorama image generation apparatus 700 according to the embodiment. FIG. 4 draws a block diagram in which attention is paid to functions. The functional blocks can be implemented in various forms only from hardware, only from software or from a combination of them.

The panorama image generation apparatus 700 is incorporated in the game machine 200 to which the head-mounted display unit 100 is connected. However, at least part of functions of the panorama image generation apparatus 700 may be incorporated in the control unit 10 of the head-mounted display unit 100. Particularly, functions of a correction processing unit 780 hereinafter described may be incorporated in the head-mounted display unit 100 side. Alternatively, at least part of functions of the panorama image generation apparatus 700 may be incorporated in the server connected to the game machine 200 through the network.

A zooming instruction acquisition unit 710 acquires a magnification for zooming instructed by a user through the input interface 20 of the head-mounted display unit 100. The zoom magnification acquired by the zooming instruction acquisition unit 710 is supplied to a sensitivity adjustment unit 720 and a panorama image processing unit 750.

A position and rotation information acquisition unit 730 acquires information relating to the position and the rotation of the head of the user who wears the head-mounted display unit 100 on the basis of position information detected by the GPS unit 60 or a motion sensor of the head-mounted display unit 100 and posture information detected by the posture sensor 64. The position of the head of the user may be acquired by detection of a movement of the head-mounted display unit 100 by the camera of the game machine 200.

The position and rotation information acquisition unit 730 acquires the position and the rotation of the head of the user on the basis of a sensitivity instructed by the sensitivity adjustment unit 720. For example, if the user turns the neck, then a variation of the angle of the head of the user is detected by the posture sensor 64. Thus, the sensitivity adjustment unit 720 instructs the position and rotation information acquisition unit 730 to ignore the variation of the detected angle until the variation of the angle exceeds a predetermined value.

Further, the sensitivity adjustment unit 720 adjusts the sensitivity for angle detection of the head on the basis of the zoom magnification acquired from the zooming instruction acquisition unit 710. As the zoom magnification increases, the sensitivity for angle detection of the head is lowered. If zooming is performed, then since the field angle decreases, vibration of the display image caused by the swing of the head can be suppressed by lowering the angle detection sensitivity of the head.

As the motion sensor, a combination of at least one of a three-axis geomagnetic sensor, a three-axis acceleration sensor and a three-axis gyro (angular velocity) sensor may be used to detect forward-backward, leftward-rightward and upward-downward movements of the head of the user. Alternatively, position information of the head of the user may be combined to improve the sensitivity of motion detection of the head.

A coordinate transformation unit 740 uses the position and the rotation of the head-mounted display unit 100 acquired by the position and rotation information acquisition unit 730 to perform coordinate transformation for generating an image to be displayed on the head-mounted display unit 100 with a tracking function.

The panorama image processing unit 750 reads out panorama image data from a panorama image storage unit 760, generates a panorama image by a zoom magnification designated from the zooming instruction acquisition unit 710 in response to the position and the rotation of the head-mounted display unit 100 in accordance with the coordinate transformation by the coordinate transformation unit 740 and provides the panorama image to the correction processing unit 780. Here, the panorama image data may be a content of a moving picture or a still picture produced in advance or may be rendered computer graphics.

The correction processing unit 780 acquires an updated latest position and rotation of the head-mounted display unit 100 from the position and rotation information acquisition unit 730 and corrects the image generated by the panorama image processing unit 750 using the updated latest position and rotation. Details of the correction process are hereinafter described.

The correction processing unit 780 provides an image after corrected to an image provision unit 770. The image provision unit 770 supplies the panorama image data generated by the panorama image processing unit 750 to the head-mounted display unit 100.

Figure 5:
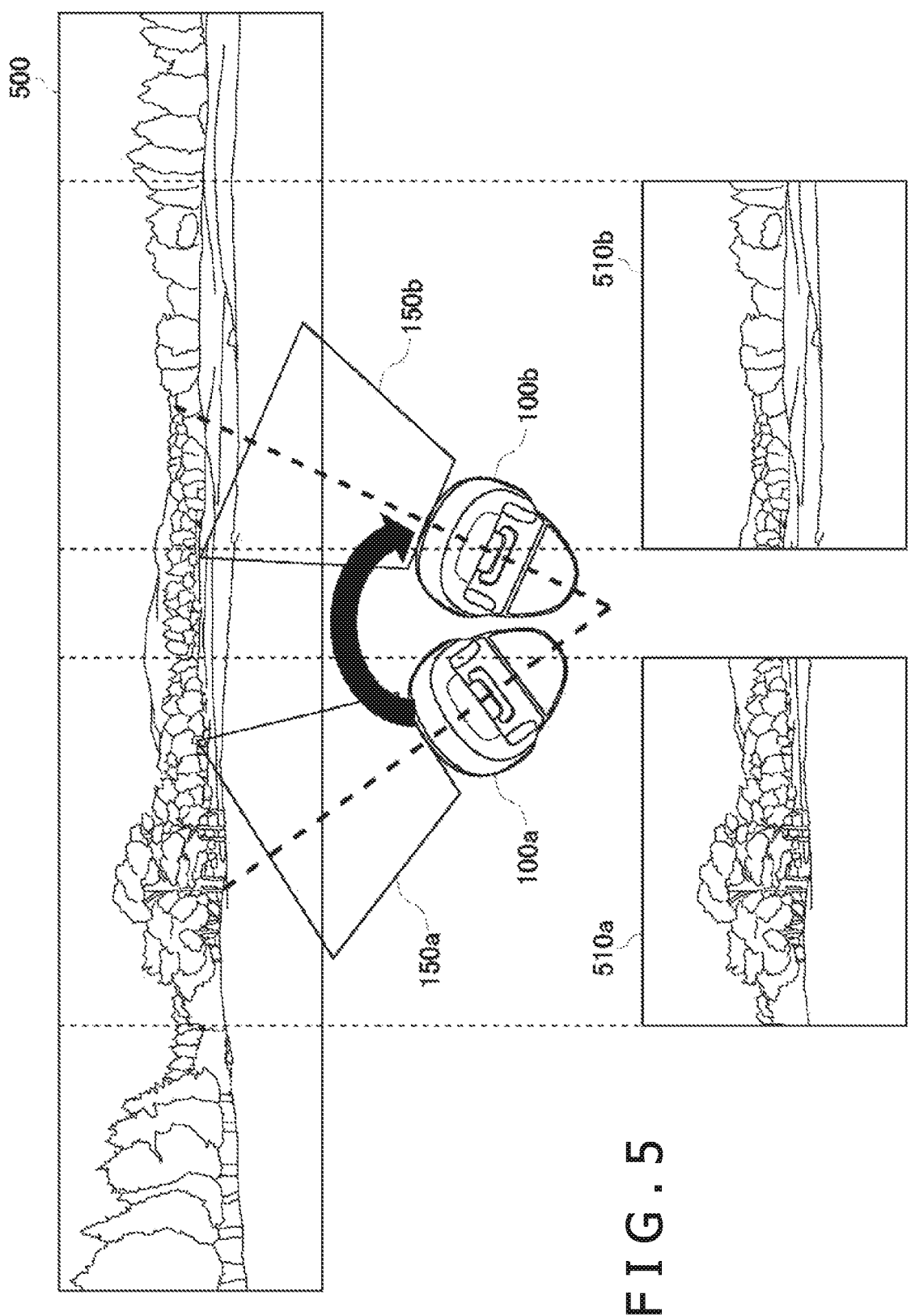
FIG. 5 is a view illustrating a panorama image displayed on the head-mounted display unit.

FIG. 5 is a view illustrating a panorama image 500 displayed on the head-mounted display unit 100. When the user is directed to the left front with respect to the panorama image 500, an image 510*a* included in the range of a field angle 150*a* in the direction of the head-mounted display unit 100*a* is displayed, but when the user turns the neck and is directed to the right front, an image 510b included in the range of a field angle 150b in the direction of the head-mounted display unit 100b is displayed.

Since the viewpoint and the viewing direction from and in which the panorama image displayed on the head-mounted display unit 100 is viewed vary in response to the movement of the head in this manner, the sense of immersion in the panorama image can be raised.

Figure 6:
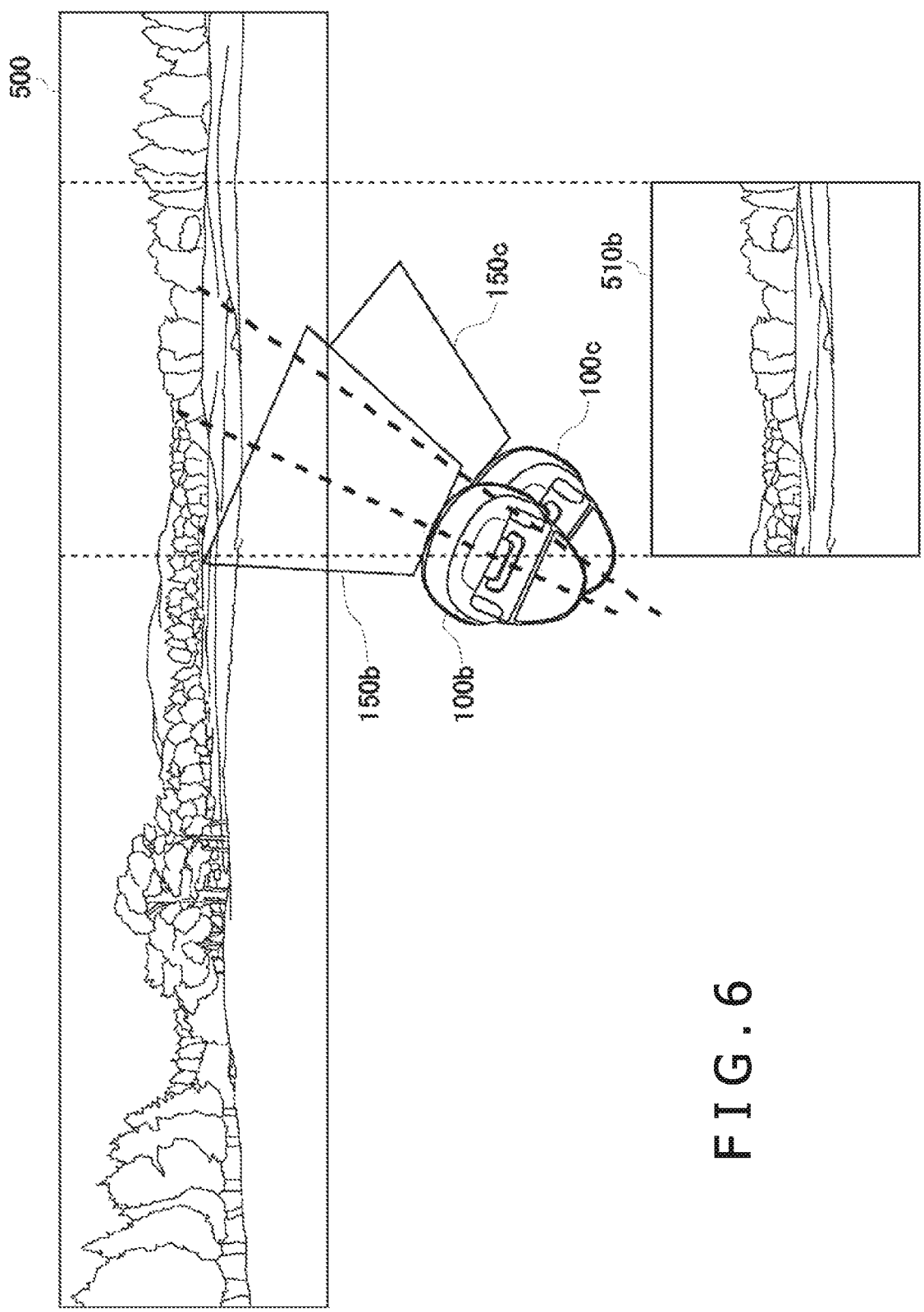
FIG. 6 is a view illustrating a reason why a correction process is required for a panorama image to be displayed on the head-mounted display unit.

FIG. 6 is a view illustrating a reason why a correction process is required for the panorama image to be displayed on the head-mounted display unit 100. If the user turns the neck and is directed to the right front, then the image 510b included in the range of the field angle 150b in the direction of the head-mounted display unit 100b is generated and displayed on the head-mounted display unit 100. However, at the point of time at which the image 510b is displayed, the position and the rotation of the head-mounted display unit 100b already indicate a change as indicated by reference character 150c. Therefore, although it is originally necessary to display an image which is viewed within the range of a field angle 150c on a head-mounted display unit 100c, the image generated and displayed actually is an image which is viewed in the range of the field angle 150b in the direction of the head-mounted display unit 100b at a point of time a little earlier. Due to the displacement by the time difference, an image in a direction a little displaced from the direction in which the user views is displayed on the head-mounted display unit 100, and the user sometimes feels a kind of drunkenness.

In the present embodiment, in order to eliminate this displacement, a process for correcting the generated image is performed. First, for the comparison, a conventional image generation process in which a correction process is not performed is described with reference to FIG. 7, whereafter a correction process of the present embodiment is described with reference to FIG. 8.

Figure 7:
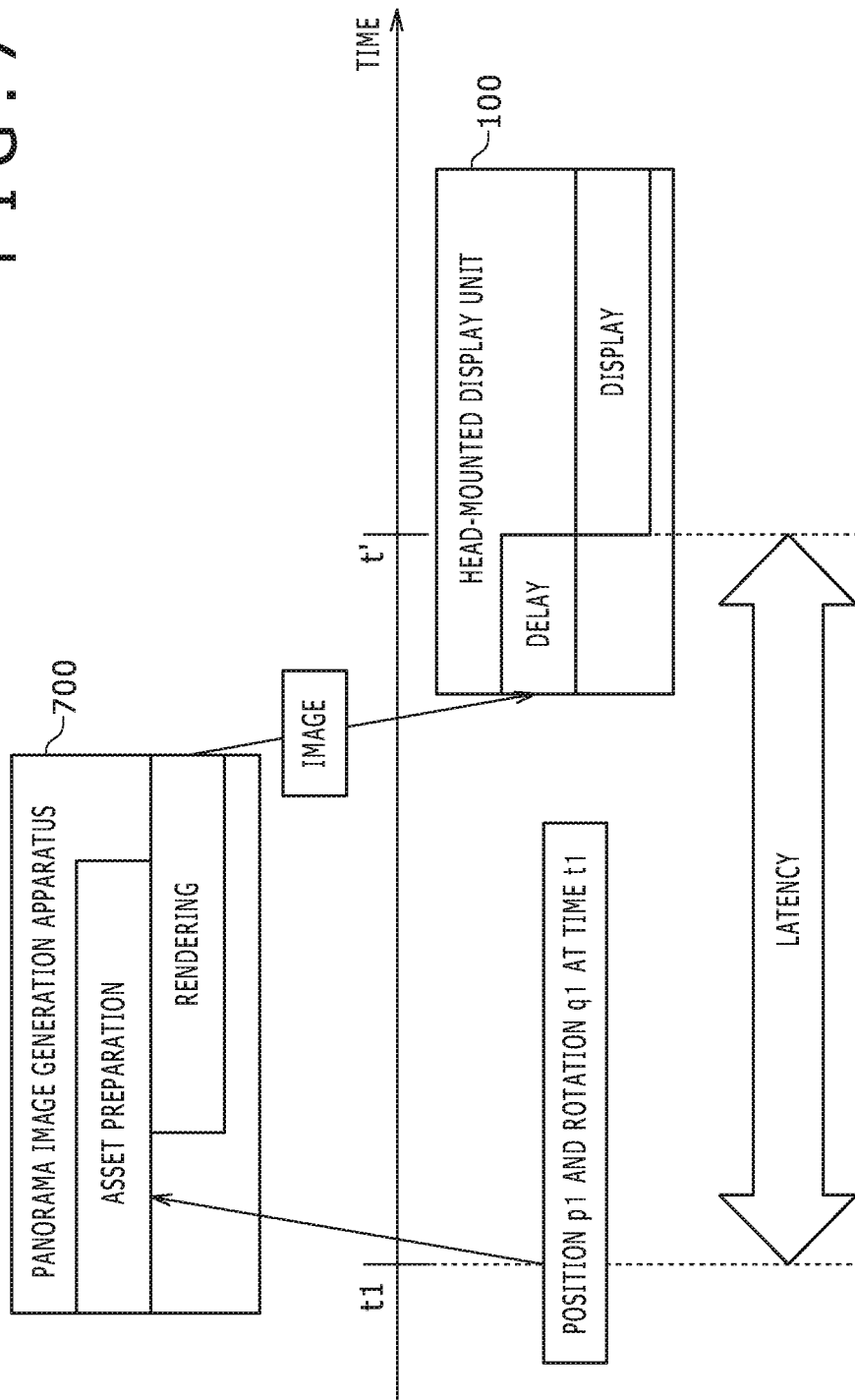
FIG. 7 is a sequence diagram illustrating a conventional image generation process which does not perform a correction process.

FIG. 7 is a sequence diagram illustrating a conventional image generation process in which a correction process is not performed.

The panorama image generation apparatus 700 performs preparations for assets such as a three-dimensional object or a texture to acquire a position p1 and a rotation q1 of the head-mounted display unit 100 at time t1. Concurrently with the asset preparations, the panorama image generation apparatus 700 preforms a process for rendering an image based on the position p1 and the rotation q1 at time t1. For example, where rendering is performed at the rate of 60 frames/second, approximately 16 milliseconds are required for generation of an image of one frame.

The image generated by the panorama image generation apparatus 700 is supplied to the head-mounted display unit 100. The head-mounted display unit 100 and the panorama image generation apparatus 700 are connected to each other by wire connection or wireless connection, and a fixed transmission time is required for the supply of an image from the panorama image generation apparatus 700 to the head-mounted display unit 100. Where the panorama image generation apparatus 700 and the head-mounted display unit 100 are connected to each other by a network, a network delay occurs.

The head-mounted display unit 100 acquires an image generated by the panorama image generation apparatus 700 and performs a displaying process such as scanning for displaying the image on the panel thereof. A delay is generated by the displaying process, and an image is displayed at time t'.

In this manner, after the position p1 and the rotation q1 of the head-mounted display unit 100 are provided to the panorama image generation apparatus 700 at time t1 until the image is displayed on the panel of the head-mounted display unit 100 at time t', a fixed period of time is required for the rendering, image transmission and displaying process, and some latency occurs as depicted in FIG. 7. Also between time t1 at which the position and the rotation of the head-mounted display unit 100 are provided for image generation and time t' at which the image is displayed on the head-mounted display unit 100, the user who wears the head-mounted display unit 100 migrates or changes the posture. As a result, the user comes to view an image based on the position and the rotation of the head-mounted display unit 100 in the past by the time difference $\Delta t = t' - t1$, and the user would feel "drunkenness" due to the displacement between the position and rotation on which the displayed image is based and the position and rotation at present.

Figure 8:
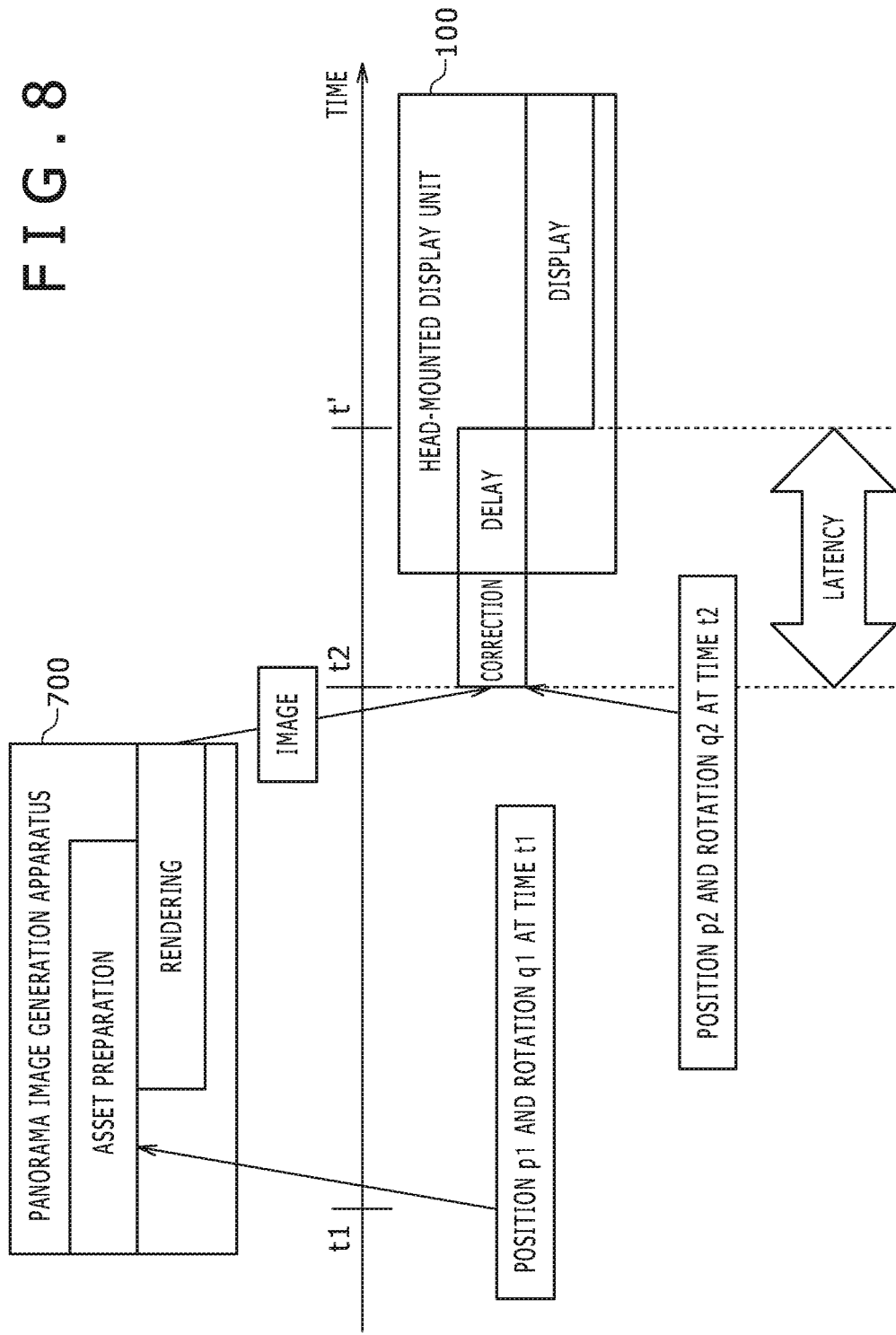
FIG. 8 is a sequence diagram illustrating an image generation process which involves a correction process of the embodiment.

FIG. 8 is a sequence diagram illustrating an image generation process which involves a correction process of the present embodiment.

The image generation process until the panorama image generation apparatus 700 acquires a position p1 and a rotation q1 at time t1 and performs asset preparation and rendering processes and then provides a generated image to the head-mounted display unit 100 is similar to the conventional image generation process of FIG. 7. In the present embodiment, at time t2 at which the panorama image generation apparatus 700 provides an image to the head-mounted display unit 100, a correction process is performed for the generated image. This correction process may be performed by any of the head-mounted display unit 100 and the panorama image generation apparatus 700. Where the head-mounted display unit 100 has a sufficient processing performance, the head-mounted display unit 100 can perform a correction process. However, if this is not the case, then the panorama image generation apparatus 700 performs a correction process and supplies an image after the correction to the head-mounted display unit 100.

Figure 11:
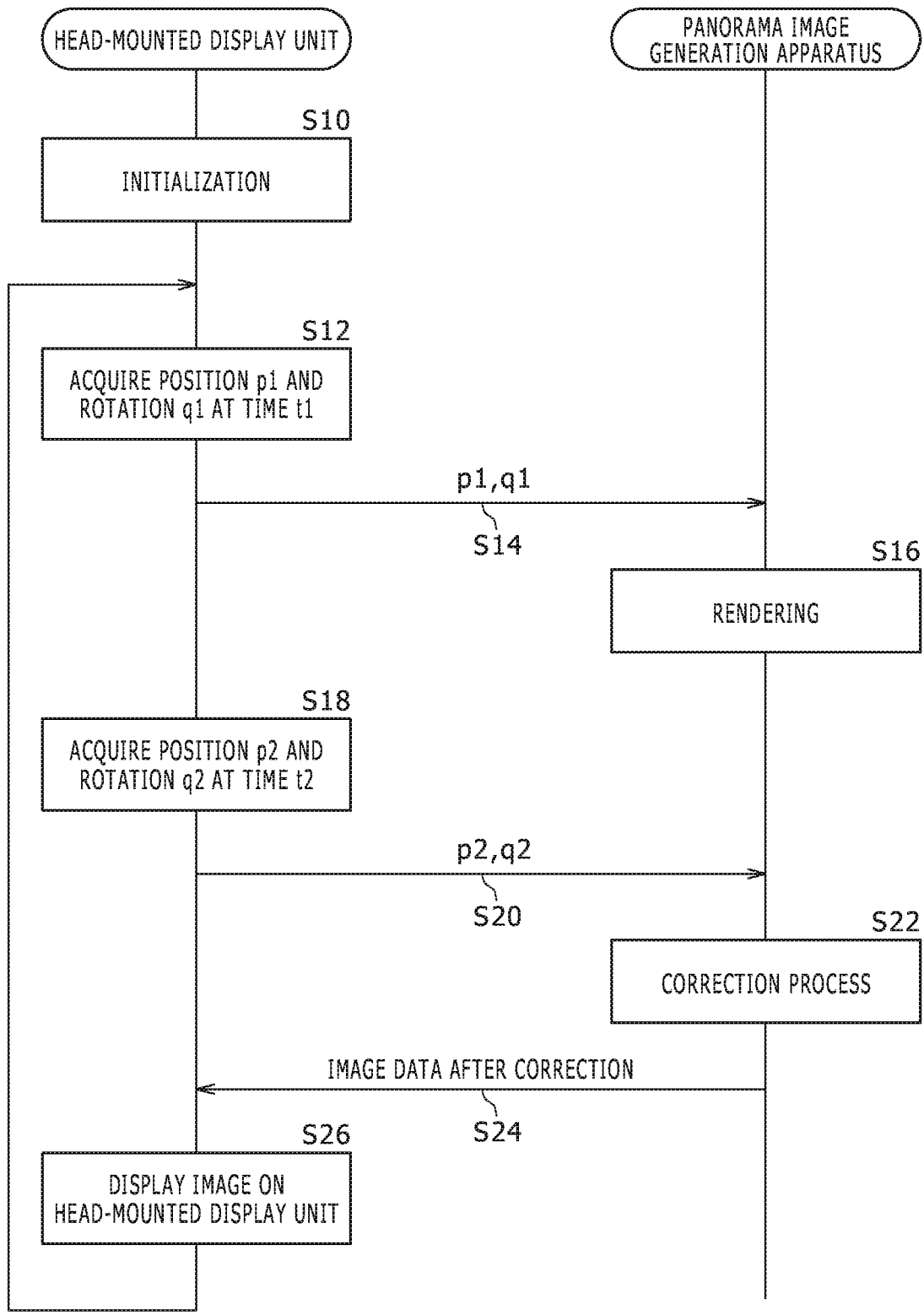
FIG. 11 is a flow chart illustrating a panorama image generation process by the panorama image generation apparatus of FIG. 4.

In the correction process, information of a position p2 and a rotation q2 of the head-mounted display unit 100 at time t2 at which an image is generated is acquired, and the image is corrected on the basis of the displacement in position and rotation of the head-mounted display unit 100 between time t1 upon starting of rendering and latest time t2. The head-mounted display unit 100 performs a display process of the corrected image to display the image on the panel. Consequently, the apparent latency is reduced to the difference between time t2 and time t' as depicted in FIG. 11.

In the following, while the correction process of the present embodiment is described, prerequisite technical matters are described first.

(1) Coordinate System

Figure 9A:
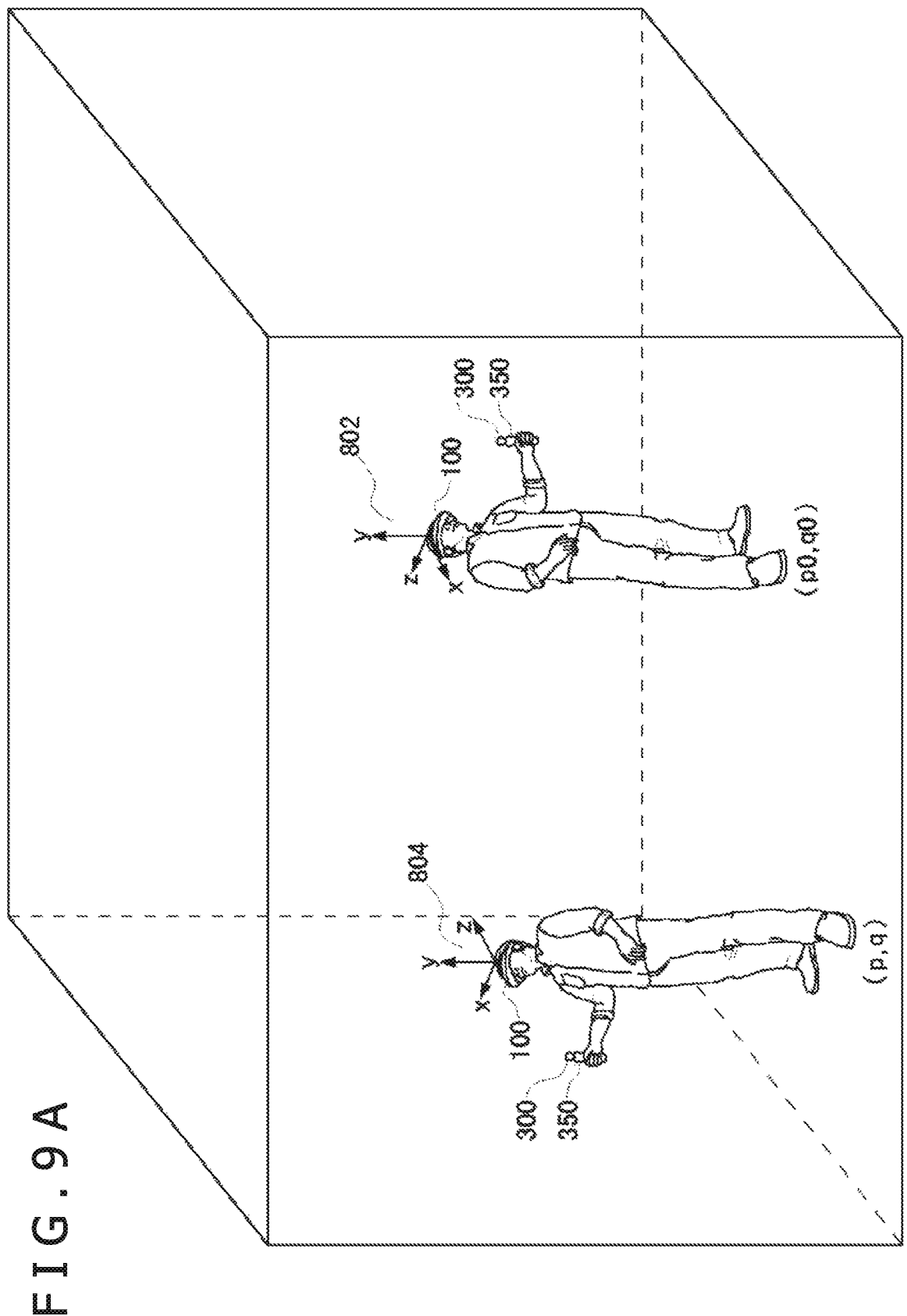
FIG. 9A is a view illustrating a relationship between a tracking coordinate system and an HMD coordinate system.
Figure 9B:
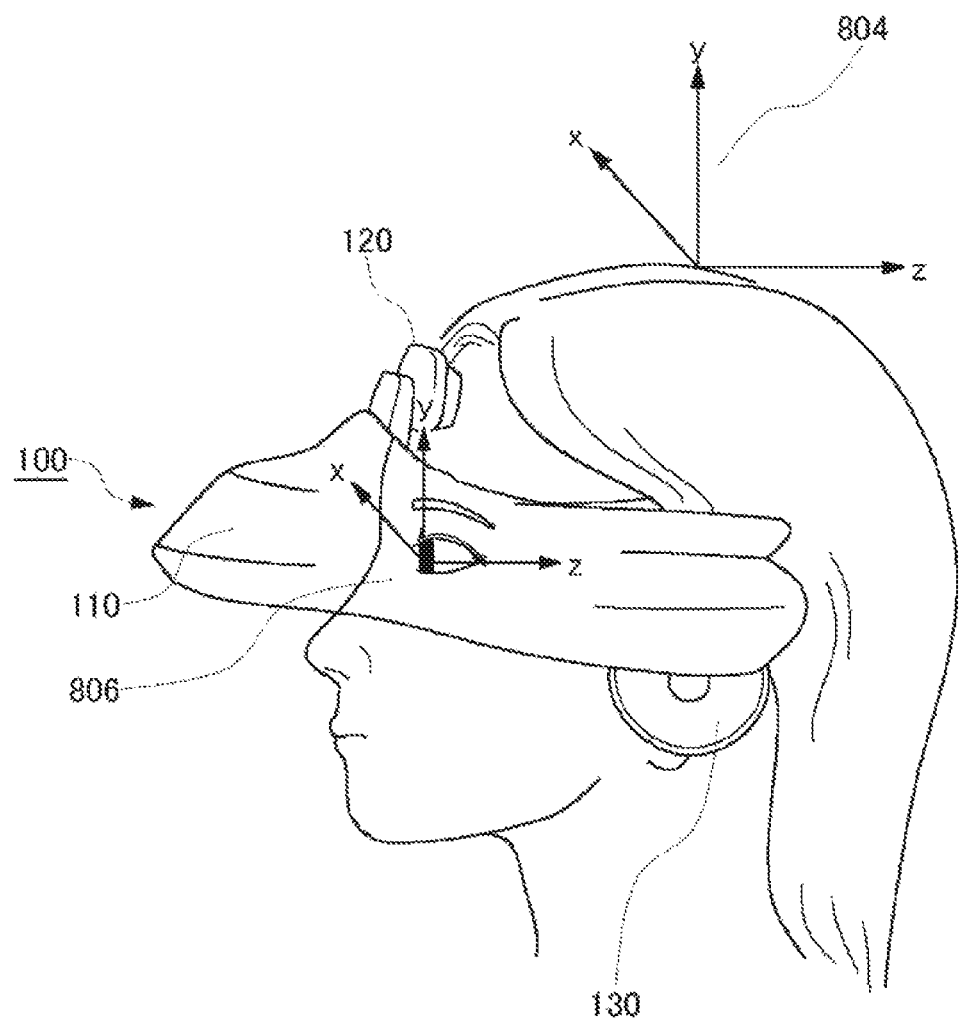
FIG. 9B is a view illustrating a relationship between the HMD coordinate system and a visual field coordinate system.

FIGS. 9A and 9B are views illustrating coordinate systems used by the head-mounted display unit 100. The head-mounted display unit 100 uses a tracking coordinate system 802, an HMD coordinate system 804 and a leftward-rightward visual field coordinate system 806.

FIG. 9A is a view illustrating a relationship between the tracking coordinate system 802 and the HMD coordinate system 804.

The tracking coordinate system 802 is a coordinate system which makes a reference to the position p and the rotation q of the head-mounted display unit 100. The tracking coordinate system 802 may be a Cartesian coordinate system, and the axes may be selected to any directions and also the origin may be determined arbitrarily. A coordinate system which is convenient for the sensors adopted in the head-mounted display unit 100 is selected. For example, upon starting of an application such as a game, a user who wears the head-mounted display unit 100 may be caused to assume a reference posture at a reference position, whereupon a reference position p0 and a reference rotation q0 of the head-mounted display unit 100 are acquired from sensor information of the head-mounted display unit 100 to determine the tracking coordinate system 802.

Alternatively, the user may have a motion controller 350 of the game machine 200 by hand. The user would operate the motion controller 350 in a state in which the head-mounted display unit 100 is worn thereon. Depending upon the game application, the hand may be moved while the motion controller 350 is held or the body may be moved. The motion controller 350 includes a three-axis gyro sensor, a three-axis acceleration sensor and a geomagnetism sensor.

A marker 300 is applied to the motion controller 350. The position of the marker 300 is detected by the camera connected to the game machine 200, and the three-dimensional coordinates of the marker 300 can be specified accurately together with position information obtained from the sensors of the motion controller 350. By setting the tracking coordinate system 802 of the head-mounted display unit 100 to the three-dimensional coordinates of the marker 300, the position and the posture of a virtual object which is controlled by the movement of the motion controller 350 and the viewpoint and the viewing direction from and in which the panorama image 500 controlled by the movement of the head-mounted display unit 100 is viewed can be processed synchronously.

The HMD coordinate system 804 is a movement coordinate system for representing the position of a device such as the display panel disposed on the head-mounted display unit 100 worn by the user. Although there is no limitation to the origin and the axes, for the convenience of description, the origin is defined so as to be the center of the head of the user. Meanwhile, the axes are defined such that, in the state in which the user wears the head-mounted display unit 100, the upward direction in the upward and downward direction is defined as Y axis; the rightward direction from the front is defined as X axis; and the direction toward this side from the front is defined as Z axis.

The user would move in a real space, change the direction of the body or turn the head in the state in which the head-mounted display unit 100 is worn. Upon starting of an application, the head-mounted display unit 100 which is in the reference position p0 and the reference rotation q0 moves together with time, and at present, the head-mounted display unit 100 is in the position p and the rotation q as depicted in FIG. 9A.

FIG. 9B is a view depicting a relationship between the HMD coordinate system 804 and the visual field coordinate system 806.

The HMD coordinate system 804 is a coordinate system wherein the top of the head of the user who wears the head-mounted display unit 100 is the origin while the upward direction is the Y axis; the rightward direction from the front is the X axis; and the direction toward this side from the front is the Z axis. On the other hand, the visual field coordinate system 806 is a coordinate system for determining the direction of displays for the left eye and the right eye. The rightward direction from one of the left and right eyes is defined as the X axis; the upward direction as the Y axis; and the direction toward this side from the front as the Z axis.

(2) Coordinate Transformation

In order to display an image on the panel of the head-mounted display unit 100, three coordinate transformations are interposed. All of the three coordinate transformations are affine transformations.

First, the image generation coordinate system (in the CG, the camera coordinate system) is transformed into the tracking coordinate system 802. Consequently, a view coordinate system when a real world or a virtual world in which a real or virtual object exists is mapped to the tracking coordinate system which represents the reference position and reference rotation of the head-mounted display unit 100.

Then, the values at present of the position p and the rotation q of the head-mounted display unit 100 are acquired from the sensor information, and the tracking coordinate system 802 is transformed into the HMD coordinate system 804. Consequently, the reference position and the reference rotation of the head-mounted display unit 100 are transformed into the position and the rotation at present.

Finally, the HMD coordinate system 804 is transformed into the visual field coordinate system 806. This transformation is a transformation which depends upon the person having the head-mounted display unit 100 worn thereon and the state in which the head-mounted display unit 100 is mounted and is fixed while the head-mounted display unit 100 remains mounted on the person. Consequently, the HMD coordinate system 804 is transformed into a coordinate system suitable for the eyes of the use of the head-mounted display unit 100.

Although, upon the image generation, coordinate transformation for transforming the tracking coordinate system 802 into the visual field coordinate system 806 via the HMD coordinate system 804 is used, upon the correction process, coordinate transformation for inversely transforming the visual field coordinate system 806 into the tracking coordinate system 802 via the HMD coordinate system 804 is used.

(3) Viewing Angle Data of Head-Mounted Display Unit 100

Figure 10:
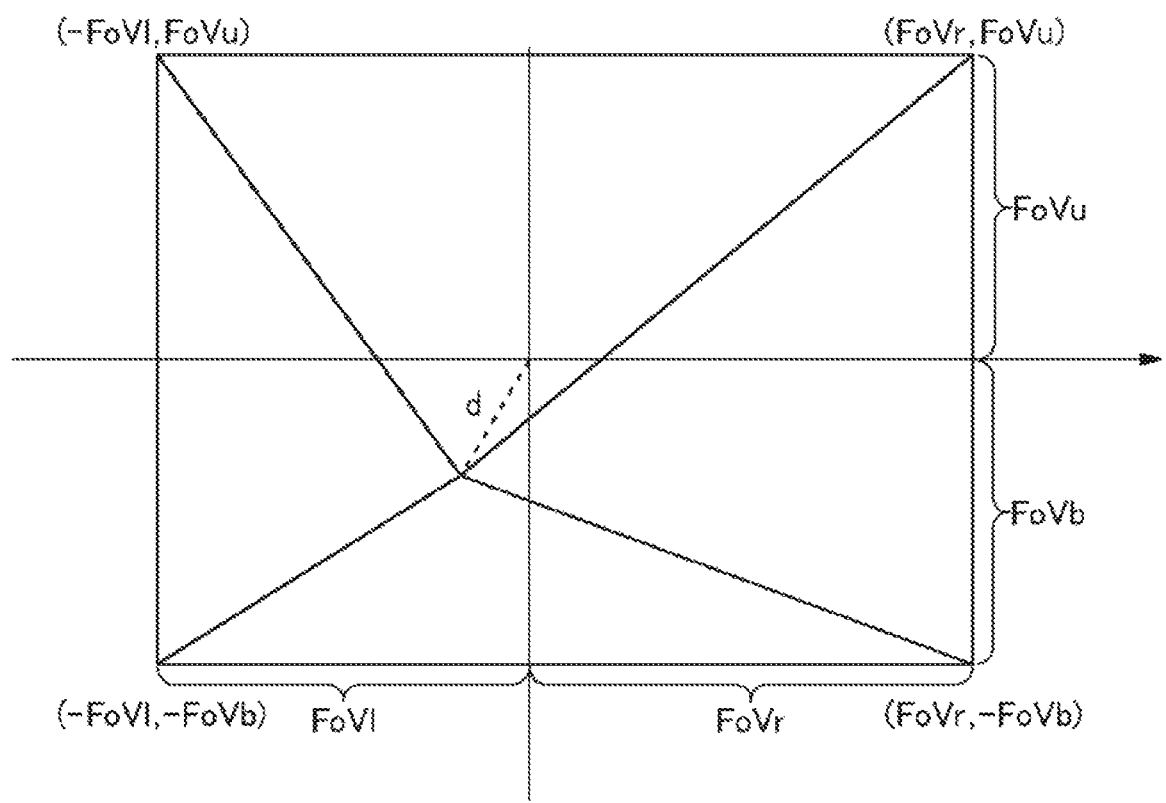
FIG. 10 is a view illustrating a visual field of a user who wears a head-mounted display unit thereon.

FIG. 10 is a view illustrating the visual field of the user who wears the head-mounted display unit 100. The visual field (field of view) extending vertically and horizontally from the center of the eyes is defined by four parameters FoVu, FoVb, FoVl and FoVr, and information of the viewing angle is defined by an arctangent using the parameters. Since the visual field for the right eye and the visual field for the left eye are defined similarly to each other, totaling eight parameters are used.

Now, an outline of a procedure for generating an image to be displayed on the head-mounted display unit 100 by the panorama image generation apparatus 700 of the present embodiment is described. Detailed calculating formulae are hereinafter described.

FIG. 11 is a flow chart illustrating a panorama image generation procedure by the panorama image generation apparatus 700.

As an initialization process, a coordinate transformation matrix from an image generation coordinate system into a tracking coordinate system is generated (S10). This is a work for determining a position and a rotation which make a reference for a movement of the head-mounted display unit 100. At a position instructed by the user, an initial position p0 and an initial rotation q0 are acquired from sensor information of the head-mounted display unit 100, and a coordinate transformation matrix from the image generation coordinate system into the tracking coordinate system is determined using the acquired values. For example, in order to determine, for example, in a race game, a posture of a person seated in a car in the game as a reference, the user is caused to assume a posture in which it is seated on a chair and directed forwardly upon starting of a race, and the position and the rotation then are determined as references.

From the sensor information of the head-mounted display unit 100, the position p1 and the rotation q1 of the head-mounted display unit 100 at time t1 are acquired (S12). The head-mounted display unit 100 provides the position p1 and the rotation q1 at time t1 to the panorama image generation apparatus 700 (S14).

The panorama image generation apparatus 700 performs rendering of an image to be displayed on the display unit of the head-mounted display unit 100 at the position p1 and the rotation q1 at time t1 (S16).

In particular, the position and rotation information acquisition unit 730 acquires the position p1 and the rotation q1 at time t1 from the head-mounted display unit 100. The coordinate transformation unit 740 performs transformation from the image generation coordinate system (camera coordinate system) into the visual field coordinate system 806 via the tracking coordinate system 802 and the HMD coordinate system 804, and the panorama image processing unit 750 renders a panorama image for each of the left and right eyes. Here, upon transformation from the tracking coordinate system 802 to the HMD coordinate system 804, affine transformation generated from the position p1 and the rotation q1 of the head-mounted display unit 100 at time t1 acquired by the position and rotation information acquisition unit 730 is used. The viewing angle is adjusted to the viewing angle information acquired from the head-mounted display unit 100.

After the rendering at time t1 by the panorama image generation apparatus 700 is completed, the position p2 and the rotation q2 of the head-mounted display unit 100 at time t2 are acquired from the sensor information of the head-mounted display unit 100 (S18). The head-mounted display unit 100 provides the position p2 and the rotation q2 at time t2 to the panorama image generation apparatus 700 (S20).

Also while the panorama image generation apparatus 700 is rendering an image, the user who wears the head-mounted display unit 100 changes the direction, and therefore, the position p2 and the rotation q2 at time t2 of the head-mounted display unit 100 are displaced a little from the position p1 and the rotation q1 at time t1, respectively.

The panorama image generation apparatus 700 performs a process for correcting the rendered images in order to absorb the displacement in position and rotation of the head-mounted display unit 100 between time t1 and time t2 (S22).

In particular, the position and rotation information acquisition unit 730 acquires the position p2 and the rotation q2 updated at latest time t2 from the head-mounted display unit 100 and provides the position p2 and the rotation q2 to the correction processing unit 780. The correction processing unit 780 further acquires the position p1 and the rotation q1 at time t1 of the head-mounted display unit 100, which have been utilized by the coordinate transformation unit 740 in order to create an affine transformation, from the position and rotation information acquisition unit 730. Further, the correction processing unit 780 acquires viewing angle data representative of the rendering field angle of the display unit of the head-mounted display unit 100. The correction processing unit 780 acquires the generated images from the panorama image processing unit 750 and renders a rectangle based on the position p1 and the rotation q1 at time t1 on the visual field coordinate system with the visual field coordinate system in regard to the position p2 and the rotation q2 at time t2.

The coordinates of the four vertices of the rectangle on the visual field coordinate system by the position p1 and the rotation q1 at time t1 are given by ($-FoVl \times d$, $FoVu \times d$, $-d$)
($-FoVl \times d$, $-FoVb \times d$, $-d$)
($FoVr \times d$, $FoVu \times d$, $-d$)
($FoVr \times d$, $-FoVb \times d$, $-d$)

(refer to FIG. 11). Here, as the value d, the focal distance of the optical system of the head-mounted display unit 100 is used.

The correction processing unit 780 maps the four vertices of the rectangle to the visual field coordinate system in regard to the position p2 and the rotation q2 at time t2. This is performed by such coordinate transformation as described below.

(A) First, the visual field coordinate system is inversely transformed into the HMD coordinate transform using the values of the position p1 and the rotation q1 at time t1, and the HMD coordinate system is further inversely transformed into the tracking coordinate system. As a result, the visual field coordinate system as viewed from the position p1 and the rotation q1 at time t1 is transformed back into the tracking coordinate system in regard to the reference position p0 and the reference rotation q0 once.

(B) Then, the tracking coordinate system is transformed into the HMD coordinate system using the values of the position p2 and the rotation q2 at time t2, and the HMD coordinate system is further transformed into the visual field coordinate system. Consequently, the tracking coordinate system based on the reference position p0 and the reference rotation q0 is converted into the visual field transform system as viewed from the position p2 and the rotation q2 at time t2.

If the entire coordinate transformations of (A) and (B) are viewed, then it is regarded that the visual field coordinate system in a case where it is viewed from the position p1 and the rotation q1 at time t1 is converted into the visual field coordinate system in another case in which it is viewed from the position p2 and the rotation q2 at time t2.

If, to the rectangle in the visual field obtained by the coordinate transformation in this manner, an image generated assuming the position p1 and the rotation q1 at time t1 is pasted as a texture, then the resulting image is a corrected image where it is viewed from the visual field coordinate system in regard to the position p2 and the rotation q2 at time t2. The image in which the displacement in position and rotation of the head-mounted display unit 100 appearing between time t1 and time t2 is corrected can be seen in the visual field at present of the user. Thus, the latency by the time difference between time t1 and time t2 is absorbed, and the "drunkenness" of the user is moderated.

The image provision unit 770 provides the image data corrected by the correction processing unit 780 to the head-mounted display unit 100 (S24). The panorama image after the correction is displayed on the head-mounted display unit 100 (S26). Thereafter, the processing returns to step S12 to repeat the processes at the steps beginning with step S12.

In the following, the correction process by the correction processing unit 780 is described in detail using mathematical formulae.

As a presumption, it is assumed that information of the position and the rotation from absolute references of the head-mounted display unit 100 can be provided by the sensors. As the sensors, the GPS unit 60 and the posture sensor 64 of the head-mounted display unit 100 are used. Further, the motion controller 350 may be used. The position p and the rotation q vary in response to a movement of the user who wears the head-mounted display unit 100. Although the head-mounted display unit 100 is a rigid body and is not a point, the position p is defined as a position of one point fixed on the head-mounted display unit 100. In the following description, the fixed one point is referred to as the central point of the head-mounted display unit 100.

An HMD position rotation matrix H is determined in accordance with the following expressions from a translation matrix T and a rotation matrix R using the position p and the rotation q of the head-mounted display unit 100.

$$H(p,q) = T(-p) \times R(q^{-1})$$

$$p = (tx, ty, tz)$$

$$q = (q1, q2, q3, q4)$$

$$|q| = 1 \quad \text{(Expression 1)}$$

The position p is a three-dimensional vector, and the rotation q is a quaternion (quaternion). −p is a result of change of the sign of the elements of p to the negative, and $q^{-1}$ is a conjugate of q (the real part of q is left as it is while the sign of the imaginary part of q is changed to the negative).

It is to be noted that the parallel translation by the translation matrix T(p) is defined by the following expression (2).

$$\begin{pmatrix} x' \\ y' \\ z' \\ 1 \end{pmatrix} = \begin{pmatrix} 1 & 0 & 0 & t_x \\ 0 & 1 & 0 & t_y \\ 0 & 0 & 1 & t_z \\ 0 & 0 & 0 & 1 \end{pmatrix} \begin{pmatrix} x \\ y \\ z \\ 1 \end{pmatrix} \quad \text{[Expression 2]}$$

The rotation by the rotation matrix R(q) is defined by the following expression.

$$\begin{pmatrix} x' \\ y' \\ z' \\ 1 \end{pmatrix} = \begin{pmatrix} q_0^2 + q_1^2 - q_2^2 - q_3^2 & 2(q_1q_2 - q_0q_3) & 2(q_1q_3 + q_0q_2) & 0 \\ 2(q_1q_2 + q_0q_3) & q_0^2 - q_1^2 + q_2^2 - q_3^2 & 2(q_2q_3 - q_0q_1) & 0 \\ 2(q_1q_3 - q_0q_2) & 2(q_2q_3 + q_0q_1) & q_0^2 - q_1^2 - q_2^2 + q_3^2 & 0 \\ 0 & 0 & 0 & 1 \end{pmatrix} \begin{pmatrix} x \\ y \\ z \\ 1 \end{pmatrix} \quad \text{[Expression 3]}$$

A calculation method of three-dimensional rotation and so forth relating to computer graphics using a quaternion is described in "Introduction to Quaternion for 3D-CG Programmers" (Kogakusha, January, 2004).

In coordinate transformation in general computer graphics, using a world transformation matrix W, a camera (view) transformation matrix V and a perspective transformation matrix P, a point (x, y, z, 1) of the world coordinate system is transformed into a point (x', y', z', 1) of a projection coordinate system in accordance with the following expression 4.

$$(x', y', z', 1) = (x, y, z, 1) \times W \times V \times P \quad \text{(Expression 4)}$$

In order to display on the display unit of the head-mounted display unit 100, the position and the rotation of the head-mounted display unit 100 must be tracked to display them on the basis of the position and the rotation of the head-mounted display unit 100 at present. Therefore, in image generation for the head-mounted display unit 100 with a tracking function, coordinate transformation in accordance with the expression given below is performed further using a tracking reference transformation matrix B, an HMD position rotation matrix H and a display position matrix D. It is to be noted here that calculation which does not involve the correction process described hereinabove is indicated.

$$(x', y', z', 1) = (x, y, z, 1) \times W \times V \times B \times H \times D \times P \quad \text{(Expression 5)}$$

Here, the tracking reference transformation matrix B is a matrix for transforming the camera (view) coordinate system into the tracking coordinate system 802 based on the reference position and the reference rotation of the head-mounted display unit 100. The tracking reference transformation matrix B can be determined as an inverse matrix of the HMD position rotation matrix H generated from sensor information when the head-mounted display unit 100 is placed at the reference position p0 and the reference rotation q0.

The HMD position rotation matrix H is a matrix for transforming the tracking coordinate system 802 into the HMD coordinate system 804. The HMD position rotation matrix H(p, q) is generated from the translation matrix T and the rotation matrix R using the position p and the rotation q acquired from the sensors upon starting of rendering as described hereinabove.

The HMD display position matrix D is a matrix for transforming the HMD coordinate system 804 into the visual field coordinate system 806. By this matrix, a point of the head-mounted display unit 100 on the HMD coordinate system 804 whose origin is the top of the head is converted into a point on the visual field coordinate system 806 whose origin is the viewpoint of the user who wears the head-mounted display unit 100. This matrix is determined from the distance from the central point of the head-mounted display unit 100 to the position of the eyes of the user who wears the head-mounted display unit 100 and the rotational angle by which the direction from the eyes of the user to the center of the display unit is inclined with respect to the center axis of the head-mounted display unit 100. Since the difference of the position of the eyes depending upon the person who wears the head-mounted display unit 100 is sufficiently small, generally the HMD display position matrix D is fixed for the device of the head-mounted display unit 100.

It is to be noted that, since the HMD display position matrix relates to the position of an eye, HMD display position matrices for the left eye and the right eye exist and are used to generate images for the left eye and the right eye, respectively. Depending upon the system, a same image is used for both eyes, and in this case, a single HMD display position matrix for both eyes is used.

The perspective transformation matrix P is a matrix for transforming a view coordinate into a perspective coordinate, and in general computer graphics, a field angle is determined freely. However, in the head-mounted display unit 100, the field angle is adjusted to the field angle of the wearing person of the head-mounted display unit 100. The perspective transformation matrix P is defined as an expression give below using the four parameters FoVu, FoVb, FoVl and FoVr indicative of the viewing angle of the user.

$$\begin{pmatrix} \frac{2}{FoVl+FoVr} & 0 & 0 & \frac{FoVl-FoVr}{FoVl+FoVr} \\ 0 & \frac{2}{FoVu+FoVb} & 0 & \frac{-FoVu+FoVb}{FoVu+FoVb} \\ 0 & 0 & \alpha & \beta \\ 0 & 0 & \pm 1 & 0 \end{pmatrix} \quad \text{[Expression 6]}$$

Here, α and β depend upon clipping of the depth, and ±1 depends upon whether the coordinate system is for the left hand or for the right hand. Since the field angles for the left eye and the right eye are sometimes different from each other (generally the field angles are symmetrical to each other in the horizontal direction), the perspective transformation matrix P for the left eye and the perspective transformation matrix P for the right eye may be different from each other.

The correction process by the correction processing unit 780 is described. Inputs provided to the correction processing unit 780 include an image generated with regard to the position p1 and the rotation q1 of the head-mounted display unit 100 at time t1, the position p1 and the rotation q1 used in the HMD position rotation matrix H when the image is generated and the updated position p2 and rotation q2 of the head-mounted display unit 100 at latest time t2.

The correction processing unit 780 generates a corrected image by performing the following transformation process for a rectangular image obtained by mapping the image generated with regard to the position p1 and the rotation q1 at time t1 on the projection plane. Where the vertices of the rectangular image are represented by (x, y, z, 1), the positions on the projection coordinate system after correction by (x', y', z', 1) and the correction matrix by C, the convention process can be represented in the following manner.

$(x',y',z',1)=(x,y,z,1) \times C$ \hfill (Expression 7)

Here, the correction matrix C is $C=D^{-1} \times H(p1,q1)^{-1} \times H(p2,q2) \times D \times P$ The four vertices of the rectangular image generated with regard to the position p1 and the rotation q1 at time t1 are (−FoVl×d, FoVu×d, −d, 1), (−FoVl×d, −FoVb×d, −d, 1), (FoVr×d, FoVu×d, −d, 1) and (FoVr×d, −FoVb×d, −d, 1). As the value of d, for example, the focal distance of the optical system of the head-mounted display unit 100 is used.

$D^{-1} \times H(p1, q1)^{-1}$ of the front half of the correction matrix C signifies that the visual field coordinate system is transformed back into the HMD coordinate system by the inverse matrix $D^{-1}$ of the HMD display position matrix and the HMD coordinate system is transformed back into the tracking coordinate system by the inverse matrix $H(p1, q1)^{-1}$ of the HMD position rotation matrix in which the position p1 and the rotation q1 at time t1 are used. Further, (p2, q2)×D×P of the latter half signifies that the tracking coordinate system is transformed into the HMD coordinate system by the HMD position rotation matrix H(p2, p2) in which the updated position p2 and rotation q2 at time t2 are used and then the HMD coordinate system is transformed into the visual field matrix system by the HMD display position matrix D, whereafter the visual field coordinate system is transformed into the projection coordinate system by the perspective transformation matrix P finally.

If the position and the rotation of the head-mounted display unit 100 do not vary between time t1 and time t2, namely, if p1=p2 and besides the q1=q2, then since H(p1, q1)$^{-1}$×H(p2, q2) becomes a unit matrix. Therefore, the correction matrix C becomes equal to the perspective transformation matrix P and the correction process is not performed, and only perspective transformation is performed as given below.

$(x',y',z',1)=(x,y,z,1) \times P$

However, if at least one of the position and the rotation of the head-mounted display unit 100 varies between time t1 and time t2, namely, if p1≠p2 and/or q1≠q2, then the correction matrix C acts to correct the displacement in position and/or rotation of the head-mounted display unit 100 by calculation of H(p1, q1)$^{-1}$×H(p2, q2).

In this manner, the rectangular image transformed by the correction matrix C is a result of correction of the projection image with regard to the position p1 and the rotation q1 at time t1 to the projection image with regard to the position p2 and the rotation q2 at time t2. Consequently, even if the position and the rotation of the head-mounted display unit 100 indicate a displacement between time t1 and time t2, the image can be corrected by the image process to absorb the displacement.

In the following, several modifications are described.

(Modification 1)

Figure 12:
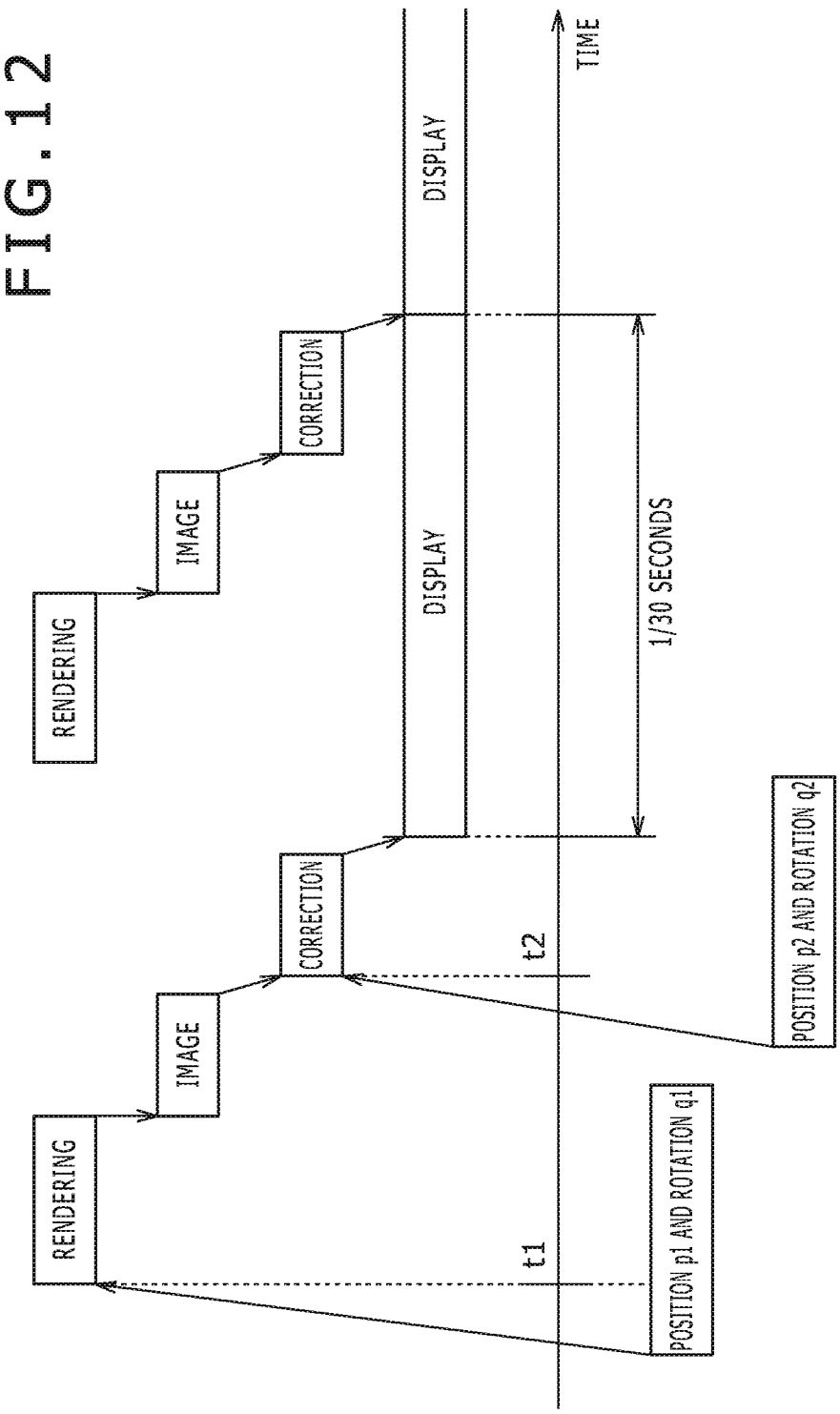
FIG. 12 is a view illustrating an image correction process of the embodiment.

A modification to the correction process of the first embodiment is described with reference to FIGS. 12 and 13. FIG. 12 is a view illustrating, for comparison, the image correction process of the first embodiment. As depicted in the figure, at time t1, the panorama image generation apparatus 700 receives a position p1 and a rotation q1 of the head-mounted display unit 100 and starts rendering. At time t2, the panorama image generation apparatus 700 performs a correction process for a generated image using the latest position p2 and the rotation q2 of the head-mounted display unit 100. If it is assumed that the frame rate of the panel of the head-mounted display unit 100 is 30 frames/second, the panorama image generation apparatus 700 generates a frame at 30 frames/second and performs the correction process and then provides an image after the correction to the head-mounted display unit 100. It is to be noted that the correction process may be performed on the head-mounted display unit 100 side.

FIG. 13 is a view illustrating the image correction process of the modification to the first embodiment. While the frame rate of the rendering by the panorama image generation apparatus 700 is 30 frames/second, if it is assumed that the frame rate of the panel of the head-mounted display unit 100 is a higher frame rate and is, for example, 60 frames/second, then, in the present modification, the frequency of the correction process is raised in accordance with the frame rate of the panel of the head-mounted display unit 100.

As depicted in the figure, a first correction process is performed for the image generated by the panorama image generation apparatus 700 using the position p2 and the rotation q2 of the head-mounted display unit 100 at time t2, and the image after the correction is displayed on the head-mounted display unit 100. Thereafter, a second correction process is performed for the same image using a position p3 and a rotation q3 of the head-mounted display unit 100 at time t3, and the image after the correction is displayed on the head-mounted display unit 100. Consequently, even if the frame rate of the panorama image generation apparatus 700 is 30 frames/second, the image after the correction is displayed at 60 frames/second. In this manner, the frame rate can be raised and lowered by performing the correction process in a predetermined frequency. Particularly where the frame rates of the panorama image generation apparatus 700 and the head-mounted display unit 100 are different from each other, a function for frame rate conversion can be provided to the system.

In the illustration of FIG. 13, the first correction process using the position p2 and the rotation q2 at time t2 and the second correction process using the position p3 and the rotation q3 at time t3 are performed for the same image generated by the panorama image generation apparatus 700. As a different method, the second correction process may be performed for the image after the correction generated by the first correction process.

(Modification 2)

Although the coordinate transformation expression (x', y', z', 1)=(x, y, z, 1)×W×V×B×H×D×P includes multiplication of the tracking reference transformation matrix B and the HMD position rotation matrix H, this calculation can be simplified. A matrix of a result when the tracking reference transformation matrix B and the HMD position rotation matrix H are multiplied is referred to as normalized HMD matrix N. The tracking reference transformation matrix B can be determined as an inverse matrix of the HMD position rotation matrix H generated from the sensor information when the head-mounted display unit 100 is placed at the reference position p0 and the reference rotation q0. Further, the HMD position rotation matrix H(p, q) is generated from the translation matrix T and the rotation matrix R using the position p and the rotation q acquired from the sensors upon starting of the rendering. Therefore, where an inverse matrix is represented by Inv(•), the normalized HMD matrix N is calculated in the following manner.

$$N = B \times H(p, q)$$
$$= Inv(T(-p0) \times (R(q0^{-1})) \times (T(-p) \times R(q^{-1}))$$
$$= Inv(R(q0^{-1})) \times Inv(T(-p0)) \times T(-p) \times R(q^{-1})$$
$$= R(q0) \times T(p0) \times T(-p) \times R(q^{-1})$$
$$= R(q0) \times T(p0 - p) \times R(q^{-1})$$
$$= R(q0) \times R(q^{-1}) \times R(q) \times T(p0 - p) \times R(q^{-1})$$
$$= R(q^{-1} \times q0) \times T(Rot(p0 - p, q^{-1}))$$

Here, Rot(p, q) signifies that the vector p is rotated by the quaternion q. In particular, if the vector p after rotation is represented by p', then p'=q×p×q$^{-1}$ is calculated. Rot(p0−p, q$^{-1}$) signifies to rotate the vector p0−p by the quaternion q$^{-1}$. With the last transformation expression given above, it is signified that the normalized HMD matrix N is translated by Rot(p0−p, q$^{-1}$) after rotated by the quaternion q$^{-1}$×q0.

If the calculation amount is evaluated, then if only the number of times of multiplication is considered, then the translation matrix T involves 0 times; the rotation matrix R 16 times; the product of the two quaternions 16 times; and the product of two rotation matrixes 36 times; and the product of the translation matrix T and the rotation matrix R 0 times. If the fourth deformation expression given above is used, then N=R(q0)×T(p0)×T(−p)×R(q$^{-1}$), and 16 times of multiplication are required for calculation of the rotation matrix R; 0 times of multiplication is required for calculation of R×T; and 36 times of multiplication are required for product of two times of the other matrices. Consequently, totaling 16×2+36×2=104 times of multiplication are required. In contrast, if the last transformation expression given above is used, then N=R(q$^{-1}$×q0)×T(Rot(p0−p, q$^{-1}$)), and 16 times of multiplication are required for the product of two quaternions and 16 times of multiplication are required for calculation of the rotation matrix R. Therefore, two times of calculation of a quaternion are required for calculation of Rot. Therefore, 16+16+16×2=64 times of multiplication are required. In comparison, if the normalized matrix N is calculated by the last transformation expression given above, then the number of times of multiplication decreases from 104 to 64 and the calculation is simplified.

(Modification 3)

The position p and the rotation q of the head-mounted display unit 100 can be predicted from sensor information in the past using a Kalman filter or the like. The image correction process described above can be used to correct the displacement between the predicted value and an actual value.

A prediction unit for sensor information is provided in the head-mounted display unit 100 or the panorama image generation apparatus 700. The prediction unit predicts a prediction position pf and a prediction rotation qf at a timing at which an image is to be displayed on the basis of the movement of the head-mounted display unit 100 in the past. The panorama image generation apparatus 700 generates an image in regard to the prediction position pf and the prediction rotation qf. The correction processing unit 780 receives a position pt at present and a rotation qt at present from the sensor information of the head-mounted display unit 100 at the present point of time and performs a correction process for the image using the position pt at present and the rotation qt at present. Consequently, even if the prediction position pf and the prediction rotation qf are displaced from the position pt at present and the rotation qt at present, respectively, the displacements between them can be absorbed by the image correction process.

(Modification 4)

Since, in the correction process, an image of a result of rendering performed once is utilized as a rendering source again to perform perspective transformation so as to be suitable for the latest position and rotation, when the movement amount is great, information in a region which is not rendered as yet is sometimes required. Several methods for coping with a problem of appearance of a missing portion are described below.

The following methods are available as a method for compensating for a missing portion.

(1) The missing portion is filled up with a color of pixels on an outermost periphery.

(2) The missing portion is filled up with a single color (for example, black).

(3) A region greater than the outermost periphery is rendered in advance so that no missing portion appears.

In order to take the method (3), as parameters for providing the four vertices of a rectangular region to be used in coordinate transformation upon image generation for the head-mounted display unit 100 with a tracking function and a transformation process upon a correction process, parameters FoVu', FoVb', FoVl' and FoVr' representative of a rendering field angle are used in place of the field angle parameters FoVu, FoVb, FoVl and FoVr unique to the head-mounted display unit. Here, FoVx'>FoVx' (here, x=u, b, l, r). It is to be noted that, in the perspective transformation matrix P to be used in a transformation process upon the correction process, the angle parameters FoVu, FoVb, FoVl and FoVr unique to the head-mounted display unit are used.

Also a method for controlling the movement amount between two time points of time t1 and time t2 so that a missing portion may not appear is available.

(1) The movement amount is limited to a limit value A, and even when the movement amount becomes B (>A)

exceeding the limit value A, the correction process is performed assuming that the movement amount is A.

(2) When the movement amount exceeds the limit value A, the correction process is not performed, and an error is determined and a process therefor is performed.

(3) The methods (1) and (2) above are combined such that, when the movement amount exceeds the first limit value A but is equal to or lower than the second limit value B (>A), it is determined that the movement amount is A and the correction process is performed, but when the movement amount exceeds the second limit value B, the correction process is not performed and a process is performed determining that an error has occurred.

By limiting the movement amount in this manner, the movement amount is included within the range of the limit value A, and a region corresponding to the movement amount can be rendered in advance so that a missing portion may not appear.

The movement amount can be calculated in the following manner. The variation amount qd of the rotation can be calculated by $qd=q^{-1} \times q0$ and the variation amount pd of the position can be calculated by $pd=p0-p$. The magnitude of the variation amount qd of the rotation depends upon the real part, and as the real part decreases, the amount of rotation increases. Since the expression for calculating the normalized HMD matrix N described hereinabove is $N=R(q^{-1} \times q0) \times T(Rot(p0-q, q^{-1}))=R(qd) \times T(Rot(pd, q^{-1}))$, the values of the variation amount qd of the rotation and the variation amount pd of the position are calculated already in the course of calculation of the normalized HMD matrix N. Since the movement amount is obtained in the process of calculation of the normalized HMD matrix N in this manner, there is an advantage that the process for analyzing the movement from images to detect a motion vector is not required.

By adopting the method of limiting the movement amount, the rendering field angle can be fixed, and a system which does not give rise to missing in image after correction as far as the movement amount does not exceed the limit value can be configured. Where a predicted value of a sensor is used to perform rendering as in the case of the modification 3, the rendering field angle can be determined depending upon the magnitude of the displacement (error) of the predicted value from the real value. In this case, if it is predicted that the error is great, then a region in the range in which the error is great is rendered, but if it is predicted that the error is small, then a region of the range in which the error is small is rendered.

(Modification 5)

In the first embodiment, in order to take both of the translational movement and the rotation into consideration, three-dimensional arithmetic operation is required in the correction process. However, the correction process can be simplified if it is assumed that only the translational movement is performed without involving the rotation. Since it is necessary to supply only the translational movement, only it is necessary to prepare an image processing device configured from a line buffer of a fixed number of rows and capable of performing translational movement. Thus, a less expensive system can be configured.

In particular, the correction process may transform coordinates $(0, 0, -d)$ of the center of an image by the correction matrix C. Only it is necessary to translationally move the movement in the x and y directions by the variation amount of x and the variation amount of y determined by the transformation.

If the user wearing the head-mounted display unit 100 shakes the head in a vertical direction or a horizontal direction, then it can be determined that the movement of the head is a vertical or horizontal translational movement, and the correction process of the present modification can be applied to this case.

Second Embodiment

In the description of the first embodiment, a correction process when a panorama image generated by the panorama image generation apparatus 700 is displayed on the head-mounted display unit 100 is described. However, in the description of a second embodiment, a correction process when a user performs an operation of a camera for a real or virtual space and an image is displayed on a screen of a computer or a portable apparatus is described. In the following description, description of a configuration and operation common to those in the first embodiment are omitted, and the correction process by the correction processing unit 780 in the second embodiment is described.

In the first embodiment, since it is assumed that a user wearing the head-mounted display unit 100 moves in a space, coordinate transformation for transforming the tracking coordinate system 802 to the visual field coordinate system 806 via the HMD coordinate system 804 is required. This is because, in the first embodiment, the viewpoint and the viewing direction of the camera must be coordinate-transformed into a position and a rotation at present of the user wearing the head-mounted display unit 100. In the second embodiment, since the viewpoint and the viewing direction of the camera operated by a user becomes the viewpoint and the viewing direction of the viewer of the computer or the portable apparatus as they are, the coordinate transformation required by the head-mounted display unit 100 is not required.

The camera transformation matrix V in the second embodiment can be determined in accordance with the following expression from the translation matrix T and the rotation matrix R using the position (viewpoint) p of the camera and the direction (viewing direction) q of the camera.

$$V(p,q)=T(-p) \times R(q^{-1}) \qquad \text{(Expression 8)}$$

Here, the position p of the camera is a three-dimensional vector, and the direction q of the camera is a quaternion.

In the second embodiment, coordinate transformation in general computer graphics is used. A point (x, y, z, 1) of the world coordinate system is transformed into a point (x', y', z', 1) of the projection coordinate system in accordance with the expression given below using the world transformation matrix W, camera (view) transformation matrix V and perspective transformation matrix P. It is to be noted here that attention is paid to the fact that calculation which does not involve a correction process is indicated.

$$(x',y',z',1)=(x,y,z,1) \times W \times V \times P \qquad \text{(Expression 9)}$$

Here, although the perspective transformation matrix P is defined similarly as in the first embodiment using the four parameters FoVu, FoVb, FoVl and FoVr indicative of the viewing angle of the user, since this relies on the field angle, if the camera is zoomed, then the field angle varies and also the perspective transformation matrix P is changed. The viewing angle parameters at time t1 are represented as FoVu1, FoVb1, FoVl1 and FoVr1 and the viewing angle parameters at time t2 are represented as FoVu2, FoVb2, FoVl2 and FoVr2. The perspective transformation matrix P at time t1 is represented as p(t1) and the perspective transformation matrix P at time t2 is represented as P(t2).

The correction process by the correction processing unit 780 in the second embodiment is described. Inputs provided to the correction processing unit 780 are the position P1 of the camera at time t1, an image generated in the direction Q1 of the camera, the position P1 of the camera and the direction Q1 of the camera used in the camera transformation matrix V when this image is generated, and the position P2 of the camera and the direction Q2 of the camera at latest time t2.

The correction processing unit 780 performs the following transformation process for a rectangular image in which the image generated with regard to the position p1 and the direction q1 at time t1 is mapped to the projection plane to generate a corrected image. If a vertex of the rectangular image is represented by (x, y, z, 1), a point on the projection coordinate system after the correction by (x', y', z', 1) and the correction matrix by C, then the transformation process can be represented in the following manner.

$$(x',y',z',1)=(x,y,z,1) \times C \qquad \text{(Expression 10)}$$

Here, the correction matrix C is $$C = V(p1,q1)^{-1} \times V(p2,q2) \times P(t2)$$

The four vertices of the rectangular image generated with regard to the position p1 and the rotation q1 at time t1 are (−FoVl1×d, FoVu1×d, −d, 1), (−FoVl1×d, −FoVb1×d, −d, 1), (FoVr1×d, FoVu1×d, −d, 1) and (FoVr1×d, −FoVb1×d, −d, 1). As the value of d, a fixed value of a suitable distance (for example, ten meters or the like) or statistical data of the depth (for example, a median of the depth value of the overall area, an average value of the depth in the proximity of the center of the area or the like) is used.

$V(p1, q1)^{-1}$ of the front half of the correction matrix C signifies to transform the camera coordinate system back into the world coordinate system by an inverse matrix $V(p1, q1)^{-1}$ of the camera transformation matrix which uses the position p1 and the rotation q1 at time t1. Further, $V(p2, q2) \times P(t2)$ of the latter half signifies to transform the world coordinate system into the camera coordinate system by the camera transformation matrix V(p2, q2) which uses the position p2 and the rotation q2 at time t2 and further transform the camera coordinate system into the projection coordinate system by the perspective transformation matrix P(t2) which uses the field angle at time t2.

If it is assumed that the position and the direction of the camera do not vary between time t1 and time t2, namely, if p1=p2 and q1=q2, then since $V(p1, q1)^{-1} \times V(p2, q2)$ becomes a unit matrix, the correction matrix C becomes equal to the perspective transformation matrix P(t2). Consequently, the correction process is not performed, and only perspective transformation which reflects the field angle at time t2 is simply performed as given below.

$$(x',y',z',1)=(x,y,z,1) \times P(t2)$$

However, if at least one of the position and the rotation of the camera varies between time t1 and time t2, namely, if p1≠p2 and/or q1≠q2, then the correction matrix C acts to correct the displacement in position and/or direction of the camera by calculation of $V(p1, q1)^{-1} \times V(p2, q2)$. Further, by performing transformation with the perspective transformation matrix P(t2) finally, also the variation in the field angle between time t1 and time t2 is reflected.

The rectangular image transformed by the correction matrix C in this manner is a result of correction of the projection image with regard to the position p1, rotation q1 and field angle at time t1 to the projection image with regard to the updated position p2, rotation q2 and field angle at time t2. Consequently, even if the position and the direction of the camera vary or the field angle varies by zooming between time t1 and time t2, the image can be corrected to absorb the displacement by the image process.

The second embodiment is advantageous for the configuration of a crowd service in which a plurality of terminals utilize a service provided by an application server through a network. In this case, the image generation apparatus is provided in the server, and any terminal transmits information of a camera operation to the server and receives an image generated by the server through the network. However, since a fixed latency is caused by time required for image generation by the server and time required for network transfer, the camera operation of the user cannot be reflected on the real time basis. With the second embodiment, an image generated on the basis of the position and the direction of the camera upon image generation can be corrected so as to coincide with the latest position and direction of the camera upon image display. Consequently, the real time performance can be provided artificially.

Especially, in a game application, where the user uses a button of a game controller, a touch screen of a portable terminal or the like to change the viewpoint position and the viewing direction in a virtual space to perform interaction with a character of a different user in the game, the real time performance makes a significant factor. In such a case, it is useful to artificially provide the real time performance by the correction process.

As described above, with the first embodiment and the second embodiment, by correcting an image generated on the basis of a viewpoint position and a viewing direction at a point of time of image generation using a viewpoint position and a viewing direction at a point of time of image display, a time difference after the point of time of image generation till the point of time of image display can be absorbed to reduce the apparent latency.

The present invention has been described in connection with the embodiments. The embodiments are illustrative, and it can be recognized by those skilled in the art that various modifications are possible in regard to the components and the processes of the embodiments and that also such modifications fall within the scope of the present invention. Such modifications are described.

REFERENCE SIGNS LIST

10 Control unit, 20 Input interface, 30 Output interface, 32 Backlight, 40 Communication controlling unit, 42 Network adapter, 44 Antenna, 50 Storage unit, 60 GPS unit, 62 Wireless unit, 64 Posture sensor, 70 External input/output terminal interface, 72 External memory, 80 Clock unit, 100 Head-mounted display unit, 110 Main body unit, 120 Front head portion contact unit, 130 Side head portion contact portion, 200 Game machine, 300 Marker, 350 Motion controller, 500 Panorama image, 700 Panorama image generation apparatus, 710 Zooming instruction acquisition unit, 720 Sensitivity adjustment unit, 730 Position and rotation information acquisition unit, 740 Coordinate transformation unit, 750 Panorama image processing unit, 760 Panorama image storage unit, 770 Image provision unit, 780 Correction processing unit

INDUSTRIAL APPLICABILITY

The present invention can be applied to a technology for generating an correcting an image.

The invention claimed is:

1. An image generation apparatus, comprising:
   a processor coupled to a memory storing instructions that when executed by the processor, configure the processor to implement:
   an acquisition process to acquire information relating to at least one of a position and a rotation of a camera;
   an image generation process to generate an image to be displayed on a display unit in a first frequency lower than a second frequency corresponding to a frame rate of the display unit using information relating to at least one of a position and a rotation acquired at a certain point of time by the acquisition process.

2. The image generation apparatus according to claim 1, wherein the image generation apparatus is a server.

3. The image generation apparatus according to claim 2, wherein the server receives information of the camera operation from a terminal coupled to the display unit and sends the generated image to the terminal via a network.

4. The image generation apparatus according to claim 1, wherein the camera operation is performed for a real or virtual space.

5. A display unit, comprising:
   a processor coupled to a memory storing instructions that when executed by the processor, configure the processor to implement:
   a correction processing process to receive an image to be displayed on the display unit generated in a first frequency by an image generation apparatus using information relating to at least one of a position and a rotation of a camera acquired at a certain point of time and correct the image generated by the image generation apparatus using updated information relating to at least one of the position and the rotation at a different point of time, wherein:
   the correction processing process receives updated information relating to at least one of a position and a rotation in a second frequency corresponding to a frame rate of the display unit and performs multiple times of correction of the image generated by the image generation apparatus in the first frequency using a plurality of the updated information relating to at least one of the position and the rotation received in the second frequency higher than the first frequency.

6. The display unit according to claim 5, wherein the correction processing process receives n (where n is an integer equal to or greater than 2) pieces of the updated information relating to at least one of the position and the rotation in the second frequency higher than the first frequency and performs n times of correction of the same image generated by the image generation apparatus in the first frequency using the n pieces of the updated information relating to at least one of the position and the rotation.

7. The display unit according to claim 5, wherein the correction processing process receives n (where n is an integer equal to or greater than 2) pieces of the updated information relating to at least one of the position and the rotation in the second frequency higher than the first frequency and performs the first correction of the image generated by the image generation apparatus in the first frequency using the first piece of the updated information relating to at least one of the position and the rotation and then performs the i-th (where i=2, . . . , n) correction of the image corrected by the (i−1)-th correction using the i-th piece of the updated information relating to at least one of the position and the rotation.

8. The display unit according to claim 5, wherein the correction processing process, when the correction of the image causes a missing portion, fills up the missing portion with a color of pixels on an outermost periphery of the image.

9. The display unit according to claim 5, wherein the correction processing process, when the correction of the image causes a missing portion, fills up the missing portion with a predetermined single color.

10. The display unit according to claim 5, wherein the image generation apparatus renders a region greater than the outermost periphery of the image in advance so that the correction of the image causes no missing portion.

11. The display unit according to claim 5, wherein the correction processing process performs the correction of the image controlling a movement amount between different time points so that the correction of the image causes no missing portion.

12. The display unit according to claim 11, wherein the correction processing process limits the movement amount to a predetermined limit value and when the movement amount exceeds the predetermined limit value, performs the correction of the image assuming that the movement amount is the predetermined limit value.

13. The display unit according to claim 11, wherein the correction processing process, when the movement amount exceeds a predetermined limit value, does not perform the correction of the image but performs an error process.

14. The display unit according to claim 11, wherein the correction processing process sets a first limit value and a second limit value greater than the first limit value and when the movement amount exceeds the first limit value but is equal to or smaller than the second limit value, performs the correction of the image assuming that the movement amount is the first limit value, and when the movement amount exceeds the second limit value, does not perform the correction of the image but performs an error process.

15. An image correction method, comprising:
   a correction processing step for receiving an image to be displayed on a display unit generated in a first frequency by an image generation apparatus using information relating to at least one of a position and a rotation of a camera acquired at a certain point of time and correcting the image generated by the image generation apparatus using updated information relating to at least one of the position and the rotation at a different point of time, wherein:
   the correction processing step receives updated information relating to at least one of a position and a rotation in a second frequency corresponding to a frame rate of the display unit and performs multiple times of correction of the image generated by the image generation apparatus in the first frequency using a plurality of the updated information relating to at least one of the position and the rotation received in the second frequency higher than the first frequency.

16. A non-transitory computer-readable medium that stores therein a program causing a computer to execute an image generation method, the method comprising:
   a correction processing step for receiving an image to be displayed on a display unit generated in a first frequency by an image generation apparatus using information relating to at least one of a position and a rotation of a camera acquired at a certain point of time and correcting the image generated by the image generation apparatus using updated information relating to at least one of the position and the rotation at a different point of time, wherein:
the correction processing step receives updated information relating to at least one of a position and a rotation in a second frequency corresponding to a frame rate of the display unit and performs multiple times of correction of the image generated by the image generation apparatus in the first frequency using a plurality of the updated information relating to at least one of the position and the rotation received in the second frequency higher than the first frequency.

17. A system comprising an image generation apparatus and a display unit, wherein the image generation apparatus comprises:
a processor coupled to a memory storing instructions that when executed by the processor, configure the processor to implement:
an acquisition process to acquire information relating to at least one of a position and a rotation of a camera;
an image generation process to generate an image to be displayed on the display unit in a first frequency lower than a second frequency corresponding to a frame rate of the display unit using information relating to at least one of a position and a rotation acquired at a certain point of time by the acquisition process, and
wherein the display unit comprises:
a processor coupled to a memory storing instructions that when executed by the processor, configure the processor to implement:
a correction processing process to receive an image to be displayed on the display unit generated in a first frequency by an image generation apparatus using information relating to at least one of a position and a rotation of a camera acquired at a certain point of time and correct the image generated by the image generation apparatus using updated information relating to at least one of the position and the rotation at a different point of time, wherein:
the correction processing process receives updated information relating to at least one of a position and a rotation in a second frequency corresponding to a frame rate of the display unit and performs multiple times of correction of the image generated by the image generation apparatus in the first frequency using a plurality of the updated information relating to at least one of the position and the rotation received in the second frequency higher than the first frequency.

18. An image generation apparatus, comprising:
a processor coupled to a memory storing instructions that when executed by the processor, configure the processor to implement:
an acquisition process to acquire information relating to at least one of a position and a rotation of a camera;
an image generation process to generate an image to be displayed on a display unit using information relating to at least one of a position and a rotation acquired at a certain point of time by the acquisition process; and
a correction processing process to receive updated information relating to at least one of a position and a rotation at a different point of time from the acquisition process and correct the image generated by the image generation process using the updated information relating to at least one of the position and the rotation, wherein:
the image generation process generates the image to be displayed on the display unit using the information relating to at least one of the position and the rotation in a first frequency; and
the correction processing process receives updated information relating to at least one of a position and a rotation from the acquisition process in a second frequency corresponding to a frame rate of the display unit and performs multiple times of correction of the image generated by the image generation process in the first frequency using a plurality of the updated information relating to at least one of the position and the rotation received in the second frequency higher than the first frequency.

* * * * *